(12) United States Patent
Liu et al.

(10) Patent No.: US 11,766,663 B2
(45) Date of Patent: Sep. 26, 2023

(54) FUNCTIONAL NANOSCALE METAL OXIDES FOR STABLE METAL SINGLE ATOM AND CLUSTER CATALYSTS

(71) Applicants: Jingyue Liu, Scottsdale, AZ (US); Xu Li, Tempe, AZ (US)

(72) Inventors: Jingyue Liu, Scottsdale, AZ (US); Xu Li, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 426 days.

(21) Appl. No.: 16/897,871

(22) Filed: Jun. 10, 2020

(65) Prior Publication Data

US 2021/0016256 A1    Jan. 21, 2021

Related U.S. Application Data

(60) Provisional application No. 62/876,437, filed on Jul. 19, 2019.

(51) Int. Cl.
*B01J 21/04* (2006.01)
*B01J 21/06* (2006.01)
(Continued)

(52) U.S. Cl.
CPC ............ *B01J 23/75* (2013.01); *B01J 23/10* (2013.01); *B01J 23/42* (2013.01); *B01J 23/44* (2013.01);
(Continued)

(58) Field of Classification Search
CPC ........ B01J 21/04; B01J 21/063; B01J 21/066; B01J 21/08; B01J 21/10; B01J 21/12; B01J 21/14; B01J 23/10; B01J 23/20; B01J 23/34; B01J 23/42; B01J 23/44; B01J 23/46; B01J 23/52; B01J 23/56; B01J 23/63; B01J 23/6484; B01J 23/6562; B01J 23/682; B01J 23/688; B01J 23/72;
(Continued)

(56) References Cited

U.S. PATENT DOCUMENTS 4,187,168 A * 2/1980 McVicker ............... C10G 49/06
                                                        585/407
4,217,249 A * 8/1980 McVicker ............... B01J 23/46
                                                         556/14
(Continued)

OTHER PUBLICATIONS

Chen et al., "Highly active surfaces for CO oxidation on Rh, Pd, and Pt," Surf. Sci., 2007, 601:5326-5331.
(Continued)

*Primary Examiner* — Cam N. Nguyen
(74) *Attorney, Agent, or Firm* — Fish & Richardson P.C.

(57) ABSTRACT

A nanocomposite catalyst includes a support, a multiplicity of nanoscale metal oxide clusters coupled to the support, and one or more metal atoms coupled to each of the nanoscale metal oxide clusters. Fabricating a nanocomposite catalyst includes forming nanoscale metal oxide clusters including a first metal on a support, and depositing one or more metal atoms including a second metal on the nanoscale metal oxide clusters. The nanocomposite catalyst is suitable for catalyzing reactions such as CO oxidation, water-gas-shift, reforming of $CO_2$ and methanol, and oxidation of natural gas.

16 Claims, 26 Drawing Sheets

(51) Int. Cl.

| | |
|---|---|
| *B01J 21/08* | (2006.01) |
| *B01J 21/10* | (2006.01) |
| *B01J 21/12* | (2006.01) |
| *B01J 21/14* | (2006.01) |
| *B01J 23/10* | (2006.01) |
| *B01J 23/20* | (2006.01) |
| *B01J 23/34* | (2006.01) |
| *B01J 23/42* | (2006.01) |
| *B01J 23/44* | (2006.01) |
| *B01J 23/46* | (2006.01) |
| *B01J 23/52* | (2006.01) |
| *B01J 23/56* | (2006.01) |
| *B01J 23/63* | (2006.01) |
| *B01J 23/64* | (2006.01) |
| *B01J 23/68* | (2006.01) |
| *B01J 23/72* | (2006.01) |
| *B01J 23/745* | (2006.01) |
| *B01J 23/75* | (2006.01) |
| *B01J 23/755* | (2006.01) |
| *B01J 23/83* | (2006.01) |
| *B01J 23/84* | (2006.01) |
| *B01J 23/88* | (2006.01) |
| *B01J 23/89* | (2006.01) |
| *B01J 35/00* | (2006.01) |
| *B01J 35/10* | (2006.01) |
| *C01B 32/50* | (2017.01) |
| *C01B 3/16* | (2006.01) |
| *C01B 3/32* | (2006.01) |
| *C01B 3/40* | (2006.01) |
| *B01J 37/02* | (2006.01) |

(52) U.S. Cl.
CPC ............ *B01J 23/72* (2013.01); *B01J 23/745* (2013.01); *B01J 35/0013* (2013.01); *B01J 35/1014* (2013.01); *B01J 37/0221* (2013.01); *C01B 3/16* (2013.01); *C01B 3/326* (2013.01); *C01B 3/40* (2013.01); *C01B 32/50* (2017.08); *C01B 2203/0233* (2013.01); *C01B 2203/0261* (2013.01); *C01B 2203/0283* (2013.01); *C01B 2203/107* (2013.01); *C01B 2203/1082* (2013.01); *C01B 2203/1223* (2013.01); *C01B 2203/1241* (2013.01)

(58) Field of Classification Search
CPC ........ B01J 23/745; B01J 23/75; B01J 23/755; B01J 23/83; B01J 23/8474; B01J 23/8892; B01J 23/89; B01J 23/8906; B01J 23/8913; B01J 23/892; B01J 23/8926; B01J 23/894; B01J 23/898; B01J 23/8986; B01J 35/0013; B01J 35/1014; C01B 32/50; C01B 3/16; C01B 3/326; C01B 3/40
USPC ................ 502/258–262, 300, 304, 327–328, 502/332–339, 344, 349–351, 355, 415, 502/439
See application file for complete search history.

(56) References Cited

U.S. PATENT DOCUMENTS

| | | | | |
|---|---|---|---|---|
| 4,219,447 | A * | 8/1980 | Wheelock | C07C 5/367 502/333 |
| 6,221,805 | B1 | 4/2001 | Yamashita et al. | |
| 6,967,183 | B2 * | 11/2005 | Hampden-Smith | B01J 2/006 428/673 |
| 7,141,528 | B2 * | 11/2006 | Hampden-Smith | H01M 4/8605 502/185 |
| 7,243,658 | B2 * | 7/2007 | Deevi | A24D 3/16 131/334 |
| 7,743,772 | B2 * | 6/2010 | Sundar | B01J 23/66 131/334 |
| 7,767,615 | B2 * | 8/2010 | Kinloch | B82Y 40/00 423/447.5 |
| 7,879,128 | B2 * | 2/2011 | El-Shall | A24B 15/28 422/186 |
| 8,020,567 | B2 * | 9/2011 | El-Shall | A24B 15/288 131/57 |
| 8,058,202 | B2 * | 11/2011 | Brady | B01J 23/52 502/340 |
| 8,360,073 | B2 * | 1/2013 | Sundar | B01J 35/0013 131/334 |
| 9,499,402 | B2 * | 11/2016 | Chakraborty | B01J 23/63 |
| 9,849,445 | B2 * | 12/2017 | Vajda | C01B 32/50 |
| 9,855,549 | B2 * | 1/2018 | Gao | B01J 35/1009 |
| 10,035,133 | B2 * | 7/2018 | Yang | B01J 23/58 |
| 10,385,032 | B1 * | 8/2019 | Vajda | B01J 23/44 |
| 10,427,183 | B2 * | 10/2019 | Granger | H01F 1/0054 |
| 10,576,460 | B2 * | 3/2020 | Toyama | B01D 53/945 |
| 10,640,435 | B2 * | 5/2020 | Stair | B01J 37/0244 |
| 10,654,772 | B2 * | 5/2020 | Vajda | B01J 23/42 |
| 11,014,073 | B2 * | 5/2021 | Egashira | B01J 29/12 |
| 11,046,585 | B2 * | 6/2021 | Chopra | H01M 4/366 |
| 11,219,884 | B2 * | 1/2022 | Takeda | B01J 23/464 |
| 11,351,522 | B2 * | 6/2022 | Lou | B01J 21/04 |
| 2005/0065026 | A1 * | 3/2005 | Okubo | B01J 37/0072 502/339 |
| 2006/0160694 | A1 * | 7/2006 | Nemana | B01J 37/0209 502/308 |
| 2007/0292329 | A1 | 12/2007 | Tanaka et al. | |
| 2020/0030774 | A1 * | 1/2020 | Gao | B01J 37/10 |
| 2020/0094228 | A1 * | 3/2020 | Yasumatsu | B01J 27/224 |
| 2020/0391185 | A1 | 12/2020 | Lou et al. | |
| 2021/0077986 | A1 * | 3/2021 | Takeda | F01N 3/10 |

OTHER PUBLICATIONS

Duan et al., "Stability investigation of a high number density Pt1/Fe2O3 single-atom catalyst under different gas environments by HAADF-STEM," Nanotechnology, 2018, 29:204002 (10 pages).

Falsig et al., "Trends in the Catalytic CO Oxidation Activity of Nanoparticles," Angew. Chem. Int. Ed., 2008, 47:4835-4839.

Lou et al., "Super Active Pt1/Fe2O3 And Pt1/CeO2 Single-Atom Catalysts For CO Oxidation At Elevated Temperatures," NAM25 Poster, Jun. 4-9, 2017, 1 page.

Oran et al., "Mechanisms of CO oxidation reaction and effect of chlorine ions on the CO oxidation reaction over Pt/CeO2 and Pt/CeO2/γ—Al2O3 catalysts," Appl. Catal. B: Environ., 2004, 54:183-191.

Ozawa et al., "Three way catalytic activity of thermally degenerated Pt/Al2O3 and Pt/CeO2—ZrO2 modified Al2O3 model catalysts," Catalysis Today, 2015, 242:329-337.

Parkinson et al., "Carbon monoxide-induced adatom sintering in a Pd-Fe3O4 model catalyst," Nature Materials, Aug. 2013, 12:724-728.

Vile et al., "A Stable Single-Site Palladium Catalyst for Hydrogenations," Angew. Chem. Int. Ed., 2015, 54:11265-11269.

Yang et al., "Cataytically active Au-O(OH)x-species stabilized by alkali ions on zeolites and mesoporous oxides," Science, Dec. 19, 2014, 346(6216):1498-1501.

Zhou et al., "CO Oxidation over Supported Pt Clusters at Different CO Coverage," Int. J. Quant. Chem., 2016, 116:939-944.

U.S. Appl. No. 16/898,173, Lou et al., filed Jun. 10, 2020.

Jones et al., "Thermally stable single-atom platinum-on-ceria catalysts via atom trapping." Science, Jul. 8, 2016, 353(6206):150-154.

Kuai et al., "Atomically Dispersed Pt/Metal Oxide Mesoporous Catalysts from Synchronous Pyrolysis-Deposition Route for Water-Gas Shift Reaction," Chemistry of Materials, Aug. 16, 2018, 30:5534-5538.

(56) References Cited

OTHER PUBLICATIONS

Li et al., "Abstract: ES05.04.09 : Functional Nanoglues for Robust Single-Atom Catalysts," Presented at 2019 MRS Spring Meeting & Exhibit, Phoenix, Arizona, Apr. 22-26, 2019, 2 pages.
Li et al., "Anchoring Pt Single Atoms on CeOx Nanoclusters for CO Oxidation," Microscopy and Microanalysis, 2018, 24(Suppl 1):1660-1661.
Li et al., "Functional CeOx Nanoglues for Robust Single-Atom Catalysts," Poster, Presented at 2019 North American Catalysis Society Meeting, Chicago, Illinois, Jun. 23-28, 2018, 3 pages.
Liu, "Catalysis by Supported Single Metal Atoms," ACS Catalysis, Oct. 18, 2016, 7:34-59.
Qiao et al., "Single-atom catalysis of CO oxidation using Pt1/FeOx," Nature Chemistry, Aug. 2011, 3:634-641.
Wei et al., "Ultralow-temperature photochemical synthesis of atomically dispersed Pt catalysts for the hydrogen evolution reaction," Chemical Science, Jan. 19, 2019, 10(9):2830-2836.

\* cited by examiner

Strong Electrostatic Adsorption

Filtration
Drying
Calcination

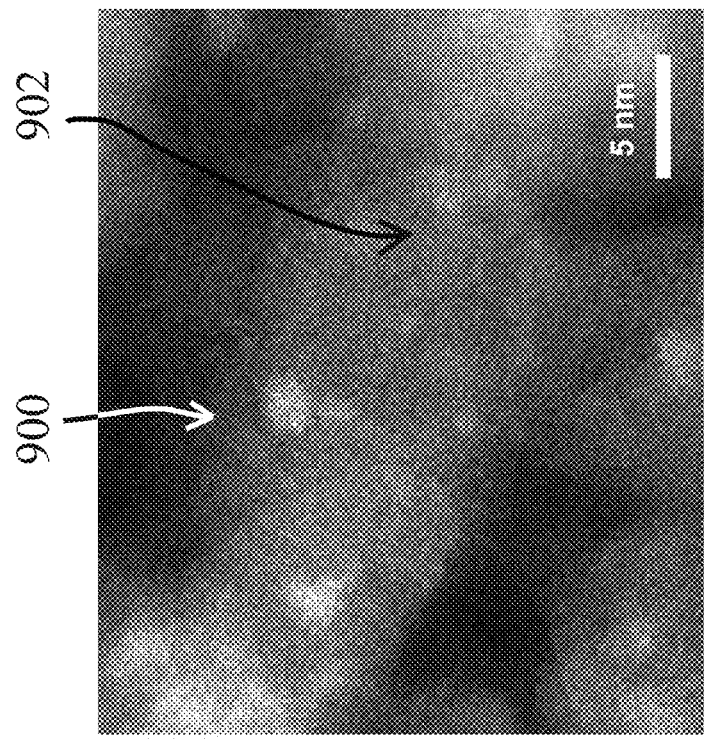
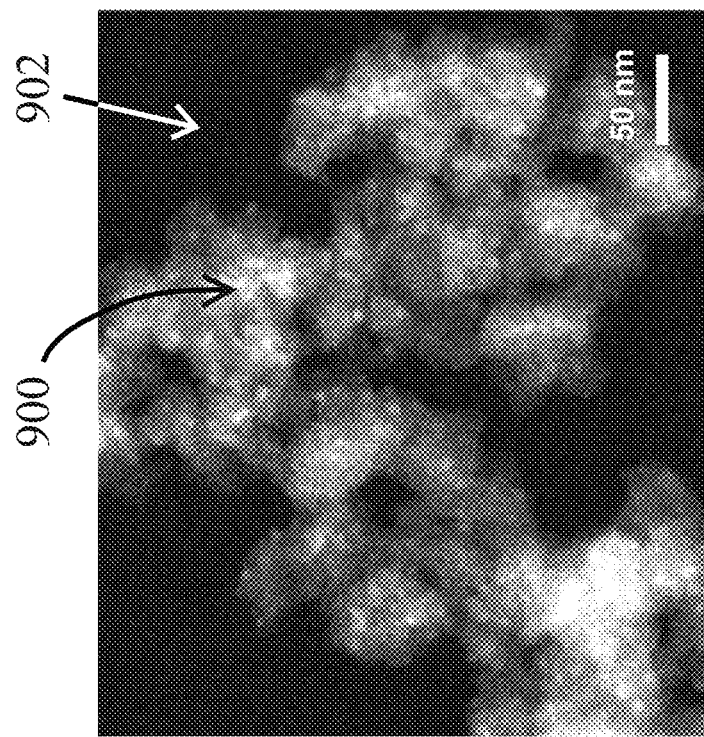
FIG 9B
FIG 9A

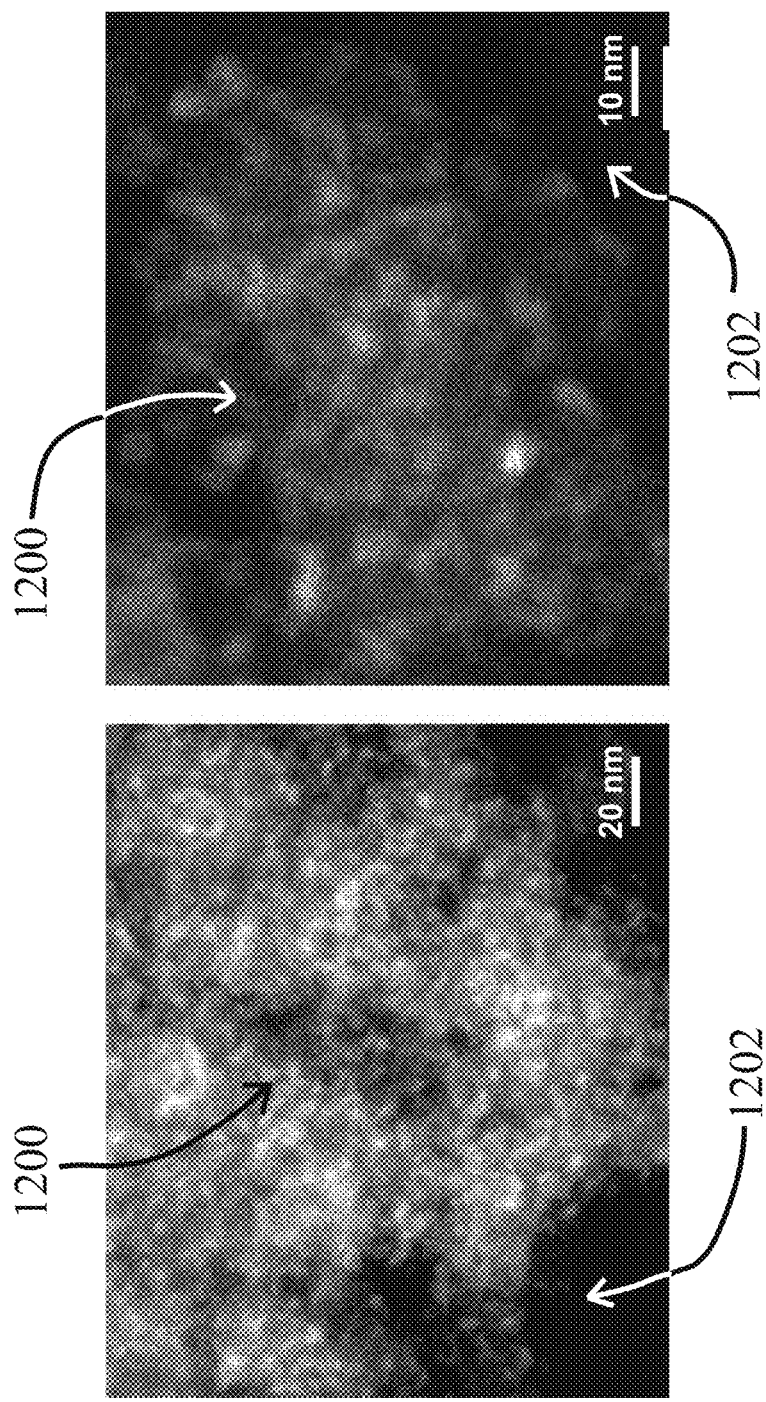

FUNCTIONAL NANOSCALE METAL OXIDES FOR STABLE METAL SINGLE ATOM AND CLUSTER CATALYSTS

CROSS-REFERENCE TO RELATED APPLICATION

This application claims the benefit of U.S. Patent Application No. 62/876,437 entitled "FUNCTIONAL NANOGULES FOR STABLE METAL SINGLE ATOM AND CLUSTER CATALYSTS" and filed on Jul. 19, 2019.

STATEMENT OF GOVERNMENT SUPPORT

This invention was made with government support under 1465057 awarded by the National Science Foundation. The government has certain rights in the invention.

TECHNICAL FIELD

This invention relates to functional nanoscale metal oxide for stable metal single atom and cluster catalysts.

BACKGROUND

Supported metal catalysts are used in many important catalytic reactions for producing chemicals and energy or for environmental remediation. Since catalysis is a surface reaction process, the use of smaller metal particles can save cost and/or yield better catalytic selectivity/activity. However, smaller metal particles, clusters or single atoms are not thermodynamically stable and usually sinter to form larger particles during a catalytic reaction, especially at elevated temperatures and under a reducing environment. For relatively high temperature catalytic reactions (e.g., control of emissions from automobiles and stationary sources), the high-surface-area supports generally need to be able to resist sintering at high temperatures. Such inert refractory support materials (e.g., $SiO_2$, $Al_2O_3$, etc.) have been used as sintering resistant high-surface-area supports, but typically do not strongly anchor metal clusters or single metal atoms.

SUMMARY

As described herein, nanoscale metal oxides are used to strongly bind the metal atoms or clusters and high-surface-area refractory supports. A facile and scalable wet chemistry synthesis approach is developed to deposit reducible nanoscale metal oxides, or "nanoislands," onto high-surface-area refractory oxide supports, and preferentially deposit metal atoms or clusters onto only the reducible metal oxide nanoislands but not onto the high-surface-area refractory oxide support surfaces. Such supported metal atom or cluster catalysts proved extremely stable and active for a variety of catalytic reactions. The reducible metal oxide nanoislands localize metal atoms or clusters to prevent sintering, and provide desirable catalytic function(s) during a targeted catalytic reaction.

This disclosure relates to the use of nanoscale metal oxides as "nanoislands" that can bind strongly to metal atoms or clusters as well as high-surface-area refractory supports. The metal oxide nanoislands typically have a dimension (e.g., diameter or height) of 0.5 nm to 10 nm. In some cases, the metal oxide nanoislands having a dimension of 0.5 nm up to 3 nm are referred to as "nanoglues," while the metal oxide nanoislands having a dimension of 3 nm to 10 nm are referred to as "nanoparticles" or "nanocrystals."

In some embodiments, metal atoms, clusters, or particles are deposited on refractory support surfaces on which a nanoscale metal oxide has been dispersed, thereby strongly binding the metal species. The individual metal oxide nanoislands are isolated from each other. This approach allows scalable manufacturing of sintering resistant atomically dispersed metal catalysts. Many types of reducible metal oxides may be utilized to produce metal oxide nanoislands. The choice of suitable metal oxides depends on the specific catalytic reaction of interest. In this case, the nanoislands possess their own function (e.g., providing readily available active surface and/or lattice oxygen species) during a catalytic reaction. To construct a stable atomically dispersed or cluster catalyst, any metal species, including noble metal species, can be used. The nanoislands can include one or more reducible metal oxides. Suitable high-surface-area refractory supports include silica, alumina, magnesia, zirconia, combinations of these, and other appropriate materials such as cordierite and perovskite-type oxides. In one example, $CeO_x$, a highly reducible metal oxide, is used as a nanoisland, and high-surface-area $SiO_2$ is used as the support material. Through a facile and scalable wet chemistry synthesis method, Pt single atoms, clusters, or nanoparticles are preferentially deposited onto the $CeO_x$ nanoisland to produce a $Pt_1/CeO_x$—$SiO_2$ single-atom catalyst or $Pt_n/CeO_x$—$SiO_2$ cluster catalyst. Such catalysts have proven to be extremely active and stable for CO oxidation reaction, even at temperatures below 150° C.

In a first general aspect, a nanocomposite catalyst includes a support, a multiplicity of nanoscale metal oxide clusters coupled to the support, and one or more metal atoms coupled to each of the nanoscale metal oxide clusters.

Implementations of the first general aspect may include one or more of the following features.

The support may include a refractory material having a surface area of at least 50 $m^2/g$ or at least 100 $m^2/g$. Suitable examples of support materials include silica, alumina, magnesia, zirconia or any combination thereof. The support can be powdered.

The nanoscale metal oxide clusters typically have a dimension in a range of 0.5 nm to 10 nm. The nanoscale metal oxide clusters may include $CeO_x$, $COO_x$, $FeO_x$, $TiO_x$, $CuO_x$, $NiO_x$, $MnO_x$, $NbO_x$, $VO_x$, $ZrO_x$, or any combination thereof. In some cases, the nanoscale metal oxide clusters include $CeO_2$, $Co_3O_4$, $Fe_2O_3$, $TiO_2$, $CuO$, $NiO$, $MnO_2$, $Nb_2O_5$, $V_2O_5$, $ZrO_2$, or any combination thereof.

The one or more metal atoms can include metal clusters (e.g., metal clusters having 2 to 100 metal atoms). In some cases, the one or more metal atoms independently include one or more transition metal atoms, one or more precious metal atoms, or both. Examples of suitable metal atoms include Pt, Pd, Rh, Au, Ru, Ir, or any combination thereof.

The support is substantially free of direct contact with the one or more metal atoms. In some examples, the support includes $SiO_2$ and the metal oxide clusters include $CeO_x$, $CoO_x$, $CuO_x$, $FeO_x$, or any combination thereof.

In a second general aspect, fabricating a nanocomposite catalyst includes forming nanoscale metal oxide clusters including a first metal on a support, and depositing one or more metal atoms including a second metal on the nanoscale metal oxide clusters.

Implementations of the second general aspect may include one or more of the following features.

The first metal and the second metal may be the same or different. The one or more metal atoms may independently include one or more transition metal atoms, one or more precious metal atoms, or any combination thereof. In some cases, the nanoscale metal oxide clusters include $CeO_x$, $CoO_x$, $FeO_x$, $TiO_x$, $CuO_x$, $NiO_x$, $MnO_x$, $NbO_x$, $VO_x$, $ZrO_x$ (e.g., $CeO_2$, $Co_3O_4$, $Fe_2O_3$, $TiO_2$, $CuO$, $NiO$, $MnO_2$, $Nb_2O_5$, $V_2O_5$, $ZrO_2$), or any combination thereof. The support is typically free or substantially free of direct contact with the second metal. In some cases, the support includes a refractory material having a surface area of at least 50 m$^2$/g or at least 100 m$^2$/g.

In a third general aspect, catalyzing a reaction includes contacting the nanocomposite catalyst of the first general aspect with reactants, wherein the reaction comprises CO oxidation, water-gas-shift reaction, reforming of $CO_2$ and methanol, or oxidation of natural gas.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 9A shows a representative low-magnification HAADF-STEM image of $CoO_x$ nanoislands uniformly distributed throughout the high-surface-area $SiO_2$ support. FIG. 9B shows a representative high-magnification HAADF-STEM image of $CoO_x$ nanoislands.

FIG. 12A shows a representative low-magnification HAADF-STEM image of a typical $Pt_1/CeO_x$—$SiO_2$ single-atom catalyst revealing the absence of Pt nanoparticles and nanoclusters. FIG. 12B shows a representative high-magnification HAADF-STEM image of a typical $Pt_1/CeO_x$—$SiO_2$ single-atom catalyst showing the absence of Pt nanoparticles and nanoclusters.

DETAILED DESCRIPTION

Extremely stable supported metal atom and cluster catalysts have been developed by judicially integrating metal atoms (e.g., noble metal atoms), reducible metal oxides, and refractory high-surface-area supports. Atomically dispersed metal atoms and clusters are stabilized by use of nanoscale metal oxides ("nanoislands") attached to refractory support materials. The reducible metal oxides serve as a binder to confine the movement of supported metal atoms or clusters during catalytic reactions. The reducible nanoscale metal oxides not only stabilize metal atoms and clusters during a catalytic reaction at high temperatures but also provide desirable functions to enhance the activity of a desired catalytic reaction. The nanoscale metal oxides typically have a dimension (e.g., diameter or height) of 0.5 nm to 10 nm. In some cases, the nanoscale metal oxides having a dimension of 0.5 nm up to 3 nm are referred to as "nanoglues," while the nanoscale metal oxides having a dimension of 3 nm to 10 nm are referred to as "nanoparticles" or "nanocrystals."

The type of metal can be any transition metal (e.g., precious metal). Suitable metal oxides include $CeO_x$ (e.g., $CeO_2$), $CoO_x$ (e.g., $Co_3O_4$), $FeO_x$ (e.g., $Fe_2O_3$), $TiO_x$ (e.g., $TiO_2$), $CuO_x$ (e.g., $CuO$), $NiO_x$ (e.g., $NiO$), $MnO_x$ (e.g., $MnO_2$), $NbO_x$ (e.g., $Nb_2O_5$), $ZrO_x$ (e.g., $ZrO_2$) combinations of these oxides, and other appropriate meal oxides. A typical dimension for the nanoscale reducible metal oxide (e.g., diameter or height) is in a range of 0.5 nm to 10 nm. Suitable high-surface-area refractory support materials include $SiO_2$, $Al_2O_3$, $MgO$, $ZrO_2$, combinations of these oxides, and other appropriate support materials (e.g., mullite, cordierites, or perovskites).

The utilization of such manufactured stable catalysts has been tested for CO oxidation, water-gas-shift reaction, reforming of $CO_2$ and methanol, oxidation of natural gas, and the like. The catalyst design and synthesis strategy described herein is schematically illustrated in FIGS. 1-3.

Figure 1A:
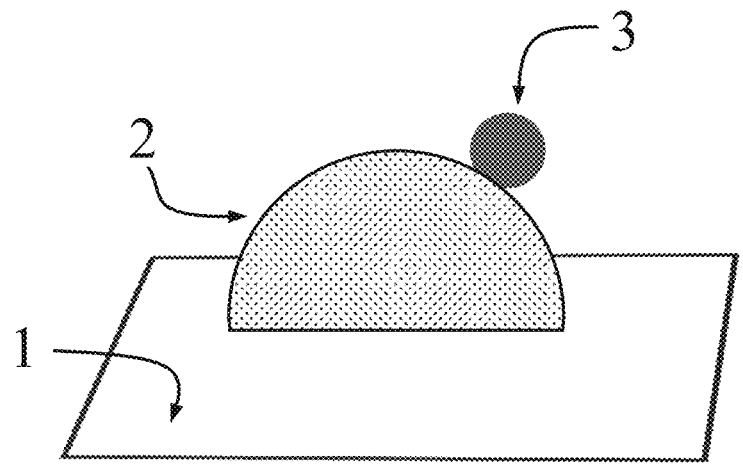
FIGS. 1A-1C depict a single metal atom, two different single metal atoms, and a metal cluster, respectively, anchored onto the surface of a reducible metal oxide nanoisland bound to the surface of a refractory oxide support.
Figure 1B:
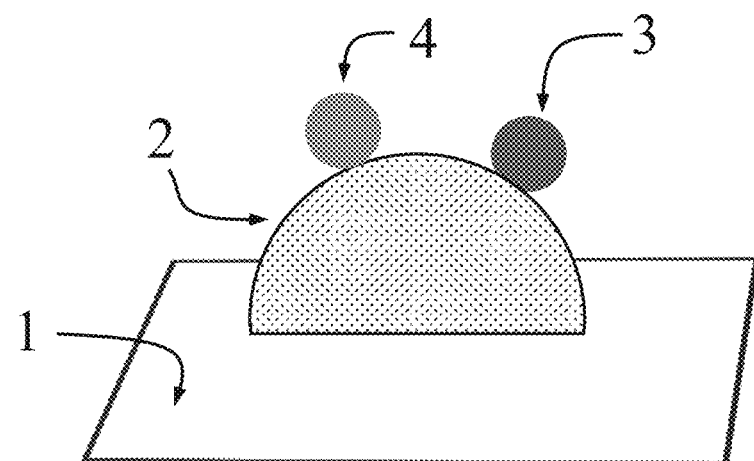
Figure 1C:
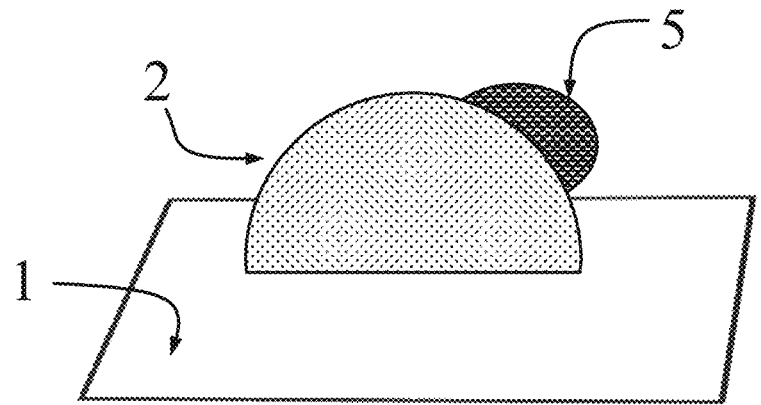

FIG. 1A depicts a single metal atom 3 preferentially anchored onto the surface of a reducible nanoscale metal oxide 2, which strongly binds onto the surface of a high-surface-area refractory oxide support 1. As used herein, "high surface area" generally refers to at least 50 $m^2$/g or at least 100 $m^2$/g. FIG. 1B depicts a single metal atom 3 and a different single metal atom 4 which are preferentially anchored onto the surface of a reducible nanoscale metal oxide 2 that strongly binds onto the surface of a refractory oxide support 1. The single metal atoms 3 and 4 can be associated with each other or independently anchored onto the surface of a reducible nanoscale metal oxide 2. FIG. 1C depicts a cluster of metal atoms (e.g., 2 to 100 metal atoms) 5 which is preferentially anchored onto the surface of a reducible nanoscale metal oxide 2 that strongly binds onto the surface of a high-surface-area refractory oxide support 1. The cluster 5 can include a single metal, a bimetallic alloy, or combinations of two or more metals. Suitable refractory oxide supports include $SiO_2$, $Al_2O_3$, $MgO$, $ZrO_2$, other appropriate materials, or any combination thereof (e.g., mullite and cordierite). Suitable nanoscale metal oxides include reducible oxide nanoclusters such as $CeO_x$, $CoO_x$, $TiO_x$, $FeO_x$, $CuO_x$, $MnO_x$, $NbO_x$, $ZrO_x$, other appropriate oxides, or any combination thereof. The reducible oxide nanoclusters typically have a dimension (e.g., diameter or height) of 0.5 nm to 10 nm. In some cases, nanoclusters having a dimension of 0.5 nm up to 3 nm are referred to as "nanoglues," while nanoclusters having a dimension of 3 nm to 10 nm are referred to as "nanoparticles" or "nanocrystals." Suitable metals for the metal atoms include precious metals (e.g., Pt, Pd, Rh, Au, Ru, Ir, Ag, and the like), transition metals, or any appropriate metal or alloy cluster with a total number of atoms in a range of 2 to 200 (e.g., 2 to 100 or 3 to 10).

Figure 2A:
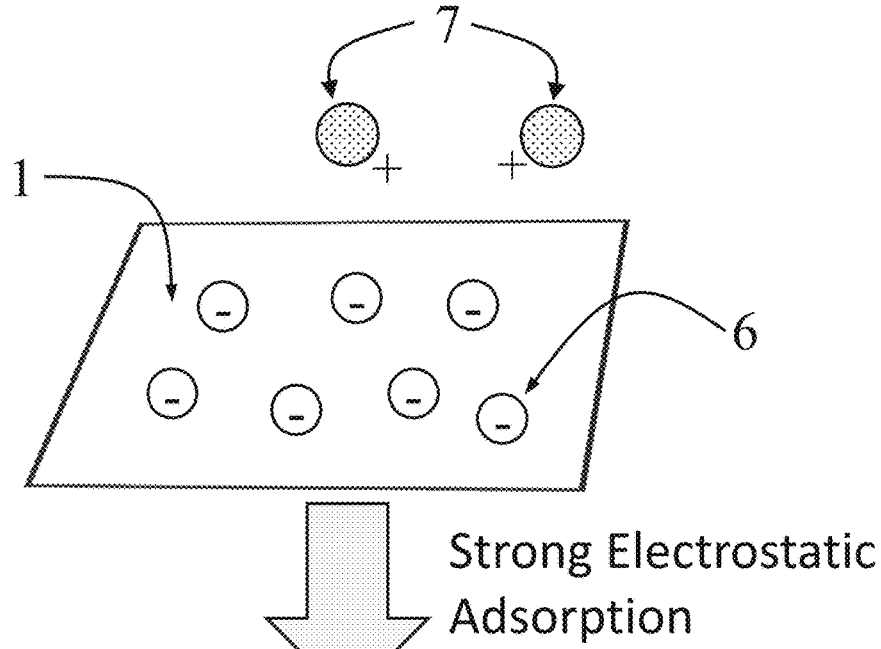
FIG. 2A depicts solution deposition of positively charged metal complexes onto the negatively charged surfaces of a refractory oxide support.
Figure 2B:
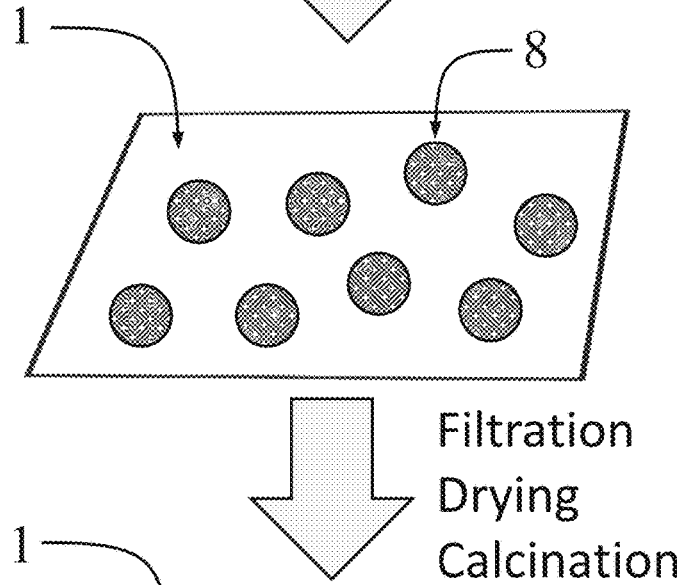
FIG. 2B depicts formation of uniformly deposited metal complexes onto the surface of a refractory oxide support.
Figure 2C:
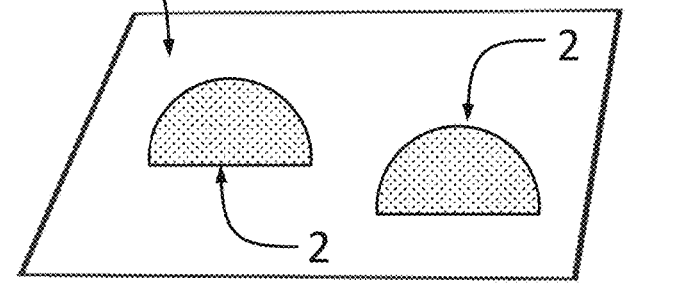
FIG. 2C depicts formation of individually isolated reducible metal oxide nanoisland by a high temperature calcination process.

FIG. 2A depicts solution deposition of positively charged metal complexes 7 onto the surface of a high-surface-area refractory oxide support 1 that are negatively charged 6 due to the presence of surface species in aqueous solution at the appropriate pH. FIG. 2B depicts formation of uniformly deposited metal complexes 8 onto the surfaces of the high-surface-area refractory support 1 via strong electrostatic adsorption processes. FIG. 2C depicts formation of individually isolated reducible metal oxide nanoisland glue 2, by a high temperature calcination process, uniformly covering the surfaces of the high-surface-area refractory oxide support 1.

Figure 3A:
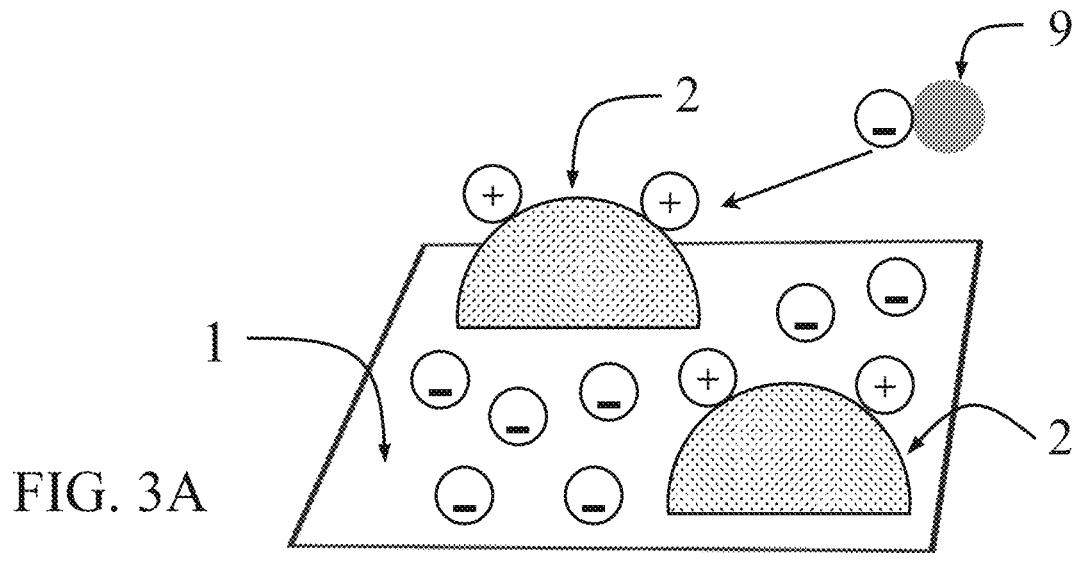
FIG. 3A depicts a process for solution deposition of negatively charged metal species onto the positively charged surfaces of the reducible metal oxide nanoisland, but not onto the negatively charged surfaces of the refractory oxide support.
Figure 3B:
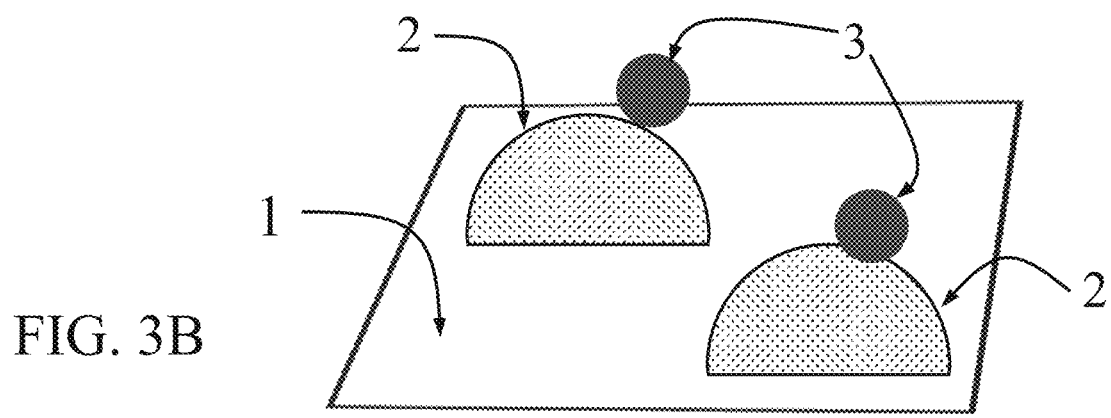
FIG. 3B depicts a single metal atom which deposits on the reducible metal oxide nanoisland which is supported on the refractory oxide support after washing, drying, and calcining processes.

FIG. 3A depicts a process for preferential solution deposition of metal atoms 9 onto the surfaces of the reducible metal oxide nanoisland glue 2, but not onto the surface of the high-surface-area refractory oxide support 1. By tuning the solution pH value, the refractory oxide support 1 can be made negatively charged while the reducible metal oxide nanoisland glue 2 becomes positively charged. The negatively charged metal complex 9 then can typically only deposit onto the positively charged reducible metal oxide nanoisland glue 2 due to strong electrostatic attraction but cannot typically deposit onto the negatively charged refractory oxide support 1 due to strong repulsion. FIG. 3B depicts single metal atom 3 which deposits on the nanoscale metal oxide 2 which are attached to the refractory oxide support 1 after washing, drying, and calcining processes.

The specific synthesis examples illustrated below follow the general principles of the design strategy. Reducible metal oxide nanoislands are used as functional nanoglues. The reducible nanoscale metal oxides are synthesized by a facile wet chemical synthesis route. Specifically, metal complexes are solution deposited onto the refractory support surfaces by a strong electrostatic adsorption method. High temperature calcination of the deposited species produces isolated individual nanoscale metal oxide islands strongly attached to the refractory support surfaces. The metal atoms and/or clusters are preferentially deposited onto the surfaces of the isolated individual nanoscale metal oxides but not onto the surfaces of the refractory support materials by fine tuning the solution pH so that the nanoscale metal oxide surfaces maintain a surface charge that is opposite to that of the deposited metal complexes, and the refractory support surfaces maintain a surface charge similar to that of the deposited metal complexes.

Atomically dispersed metal atoms and clusters are stabilized by use of nanoscale metal oxides. The synthesis processes include dispersing metal oxide clusters (e.g., 1 nm to 2 nm $CeO_x$ clusters) on a support (e.g., $SiO_2$) and then depositing single metal atoms (e.g., Pt) onto the metal oxide clusters. Extremely stable supported metal atom and cluster catalysts can be prepared by judicially integrating metal atoms (e.g., noble metal atoms), reducible metal oxide nanoglues, and refractory high-surface-area supports. The use of reducible nanoscale metal oxides stabilizes metal atoms and clusters during a catalytic reaction at high temperatures and provides desirable functions (e.g., providing readily available active surface and/or lattice oxygen species) to enhance the activity of a desired catalytic reaction.

Specific examples of facile and scalable wet chemistry methods to manufacture supported metal atom and cluster catalysts that are resistant to sintering, even at elevated temperatures and under various gas environment, are described below. In some embodiments, reducible metal oxide nanoislands strongly glue the metal atoms/clusters to a high-surface-area refractory support which can resist sintering at high temperatures. The zeta potential of different materials can be utilized to preferentially deposit metal atoms or clusters only to the reducible metal oxide nanoislands. The synthesis process is low cost, scalable, and ready for large scale manufacturing.

CO oxidation is used as a probe reaction to evaluate the stability of the prepared supported metal atom and cluster catalysts. For a $Pt_1/CeO_x$—$SiO_2$ single-atom catalyst (SAC) system, results demonstrate that the $CeO_x$ clusters stabilize the $Pt_1$ single atoms during the CO oxidation and also enhance the activity, presumably due to the redox capability of $CeO_x$ clusters that facilitate CO oxidation.

EXAMPLES

Synthesis of $CoO_x$—$SiO_2$ 180 mg of fumed $SiO_2$ powder (surface area of 278 $m^2$/g) was dispersed into 30 mL of water by sonication. 54 mg of hexamminecobalt(III) chloride was dissolved into 20 mL of ammonia solution (concentration of $NH_3 \cdot H_2O$ was 5 mol/L). Under rigorous stirring, the Co precursor was quickly injected into the $SiO_2$ solution. The mixture was aged under stirring for 1 h and then the precipitate was collected by vacuum filtration. The resultant orange Co—$SiO_2$ precipitates were removed for air dry overnight at room temperature. The dried powder was ground with a pestle and annealed at 400° C. for 12 h in a muffle furnace to obtain the dark-green $CoO_x$—$SiO_2$ powder.

Synthesis of $CuO_x$—$SiO_2$ 180 mg of fumed $SiO_2$ powder was dispersed into 30 mL of water by sonication. 48 mg of copper(II) nitrate hydrate was dissolved into 20 mL of ammonia solution (the concentration of $NH_3 \cdot H_2O$ was 5 mol/L). Under rigorous stirring, the Cu precursor solution was quickly injected into the $SiO_2$ solution. The mixture was aged under stirring for 1 h and then the blue precipitate was collected by vacuum filtration. Then the resultant Cu—$SiO_2$ precipitates were removed for air dry overnight at room temperature. The dried powders were ground with a pestle and annealed at 400° C. for 12 h in a muffle furnace to obtain the final dark-green $CuO_x$—$SiO_2$ powder.

Synthesis of $FeO_x$—$SiO_2$ 180 mg of fumed $SiO_2$ powder was dispersed into 50 mL of water by sonication. 40 mg of iron(III) nitrate was added into the $SiO_2$ solution. Under rigorous stirring, 0.2 mL of ammonia solution (the concentration of $NH_3$—$H_2O$ was 2 mol/L) was quickly injected to the mixture solution. The mixture solution was aged under stirring for 1 h and then the orange precipitate was collected by vacuum filtration. Then the resultant Fe—$SiO_2$ precipitates were removed for air dry overnight at room temperature. The dried powder was ground with a pestle and annealed at 400° C. for 1 h in a muffle furnace to produce the final orange $FeO_x$—$SiO_2$ powder.

Synthesis of 0.05 wt % $Pt_1/CeO_x$—$SiO_2$ Single-Atom Catalyst 300 mg of $CeO_x$—$SiO_2$ powder was dispersed into 72 mL DI water under sonication for 20 min. Then the pH of the solution was adjusted to below 4 by using HCl (0.1 mol/L). 530 L of platinum precursor solution (2.82 mg/mL of Pt) was diluted into 50 mL DI water and the pH was adjusted to below 4. Under rigorous stirring, the Pt precursor solution was slowly pumped into the $CeO_x$—$SiO_2$ solution under stirring over 4 h. After aging under stirring for another 2 h, the precipitates were filtered using vacuum filtration and washed with DI water 3 times to remove any non-adsorbed ions and any other residue species. The resultant precipitates were dried in air overnight and then were calcined in air at 600° C. for 12 h.

Synthesis of Reduced 0.05 wt % $Pt_1/CeO_x$—$SiO_2$ Single-Atom Catalyst 300 mg of $CeO_x$—$SiO_2$ powder was dispersed into 72 mL DI water under sonication for 20 min. Then the pH of the solution was adjusted to below 4 by using HCl (0.1 mol/L). 530 µL of platinum precursor solution (2.82 mg/mL of Pt) was diluted into 50 mL DI water and the pH value was adjusted to below 4. Under rigorous stirring, the Pt precursor solution was slowly pumped into the $CeO_x$—$SiO_2$ solution under stirring over 4 h. After aging under stirring for another 2 h, the precipitates were filtered using vacuum filtration and washed with DI water 3 times to remove any non-adsorbed ions and any other residue species. The resultant precipitates were dried in air overnight and then were calcined in air at 600° C. for 12 h. Prior to catalytic CO oxidation reaction, the as-calcined catalyst was reduced in 10 sccm (standard cubic centimeter per minute) of 5% $H_2$/He at 300° C. for 1 h. Such reduced $Pt_1/CeO_x$—$SiO_2$ SACs significantly improve CO oxidation activity.

Table 1 shows specific reaction rates of Pt (mmol CO/(gPt*s)) at different reaction temperatures.

TABLE 1

Specific reaction rates of Pt (mmol CO/($g_{Pt}$*s)) at different reaction temperatures

| Catalyst | 150° C. | 160° C. | 170° C. | $E_a$ |
|---|---|---|---|---|
| 0.05 wt % $Pt_1/CeO_x$—$SiO_2$ | 9.2 | 14.9 | 23.6 | −67.8 kJ/mol |
| 0.05 wt % Pt NPs/$CeO_x$—$SiO_2$ | 0.46 | 1.1 | 1.8 | −79.3 kJ/mol |
| 0.05 wt % Pt/$SiO_2$ | 0.045 | 0.056 | 0.077 | −140 kJ/mol |
| $CeO_x$—$SiO_2$ (control) | — | — | — | — |

The specific rates of $Pt_1$ atoms of Pt nanoparticles were measured with feed gas of 1.0 vol. % CO, 4.0 vol. % $O_2$ and He balance, pressure was 0.1 MPa. The apparent activation energy ($E_a$) of the 0.05 wt % $Pt_1/CeO_x$—$SiO_2$ single atom catalyst is the lowest, indicating most active. The conversion of CO over $CeO_x$—$SiO_2$ (control) was practically zero at the reaction temperatures evaluated.

Synthesis of 0.05 wt % $Pd_1/CeO_x$—$SiO_2$ Single-Atom Catalyst 300 mg of $CeO_x$—$SiO_2$ powder was dispersed into 72 mL DI water and the solution was then sonicated for 20 min. Then the solution pH was adjusted to below 4 using HCl (0.1 mol/L). 747 µL of palladium (II) chloride solution (2.0 mg/mL of Pd) was diluted into 50 mL DI water while the solution pH was maintained below 4. Under rigorous stirring, the Pd precursor solution slowly pumped into the $CeO_x$—$SiO_2$ solution under stirring over 4 h. After aging under stirring for another 2 h, the resultant precipitates were filtered using vacuum filtration and washed with DI water for 3 times to remove non-adsorbed ions or other residue species. The precipitates were then dried in air overnight and further calcined in air at 400° C. for 3 h.

Synthesis of 2 wt % Pt/$CeO_x$—$SiO_2$ Cluster Catalyst 300 mg of $CeO_x$—$SiO_2$ powders were immersed into 72 mL DI water under sonication for 20 min. The solution pH was maintained below 4 by using HCl (0.1 mol/L). 2.12 mL of platinum precursor solution (contains 2.82 mg/mL of Pt) was diluted into 50 mL DI water while maintaining the pH below 4. Under rigorous stirring, the Pt precursor solution was pumped into the $CeO_x$—$SiO_2$ solution over 4 h. After aging (under stirring) for another 2 h, the precipitates were filtered using vacuum filtration and washed with DI water 3 times to remove non-adsorbed ions or other residue species. The precipitates were dried in air overnight at room temperature and were then calcined in air at 600° C. for 12 h. Finally, the 2 wt % Pt/$CeO_x$—$SiO_2$ powders were reduced in 5 vol % CO at 400° C. for 5 h to produce uniformly distributed Pt nanoclusters that are attached to the $CeO_x$ nanoglues.

Figure 4B:
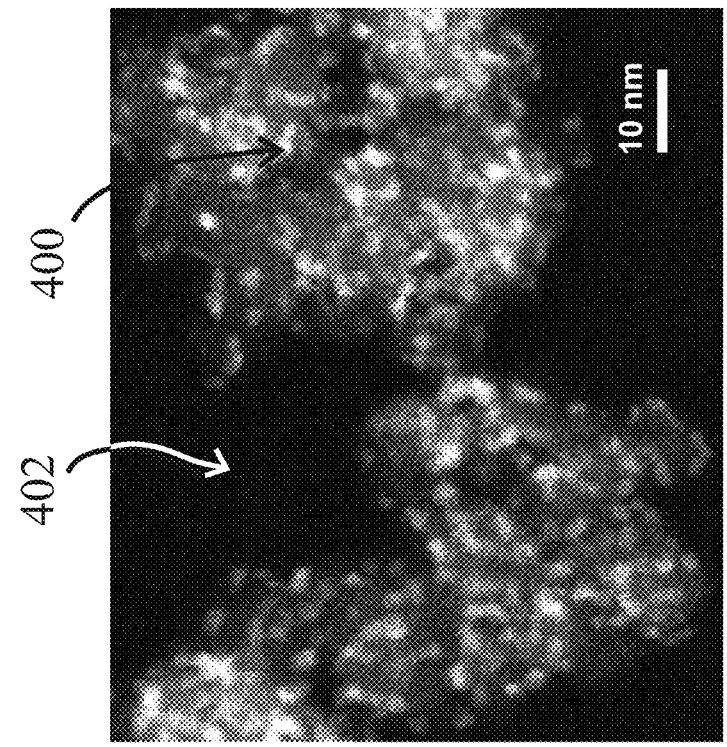
FIG. 4B shows a representative high-magnification HAADF-STEM image of $CeO_x$ nanoislands.
Figure 4A:
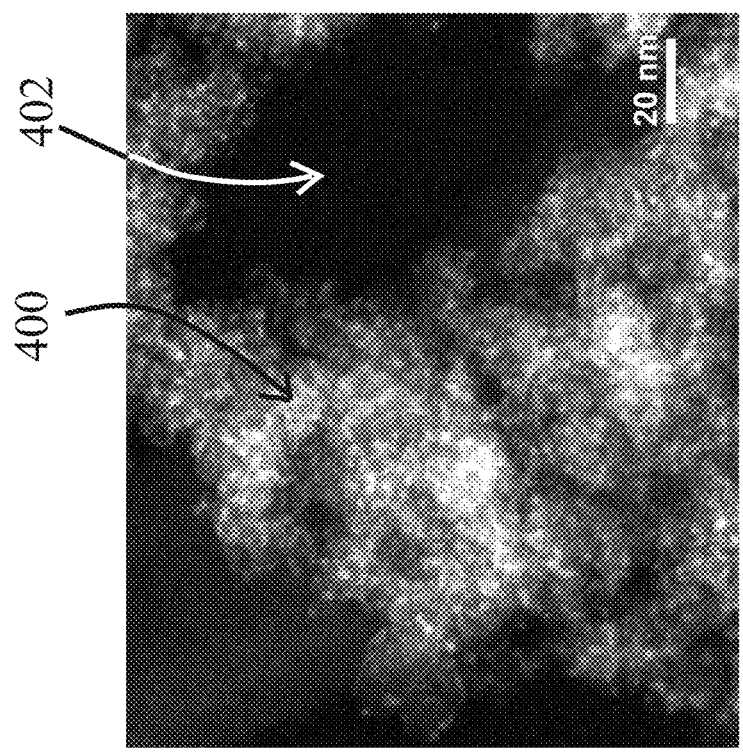
FIG. 4A shows a representative low-magnification high-angle annular dark-field-scanning transmission electron microscopy (HAADF-STEM) image of $CeO_x$ nanoislands uniformly distributed throughout a high-surface-area $SiO_2$ support.

FIG. 4A shows a representative low-magnification high-angle annular dark-field-scanning transmission electron microscopy (HAADF-STEM) image of $CeO_x$ nanoislands 400 uniformly distributed throughout a high-surface-area $SiO_2$ support 402. FIG. 4B shows a representative high-magnification HAADF-STEM image of $CeO_x$ nanoislands 400, revealing the shape, size and spatial distribution of the $CeO_x$ nanoislands that are strongly attached to the $SiO_2$ surface 402.

Figure 5:
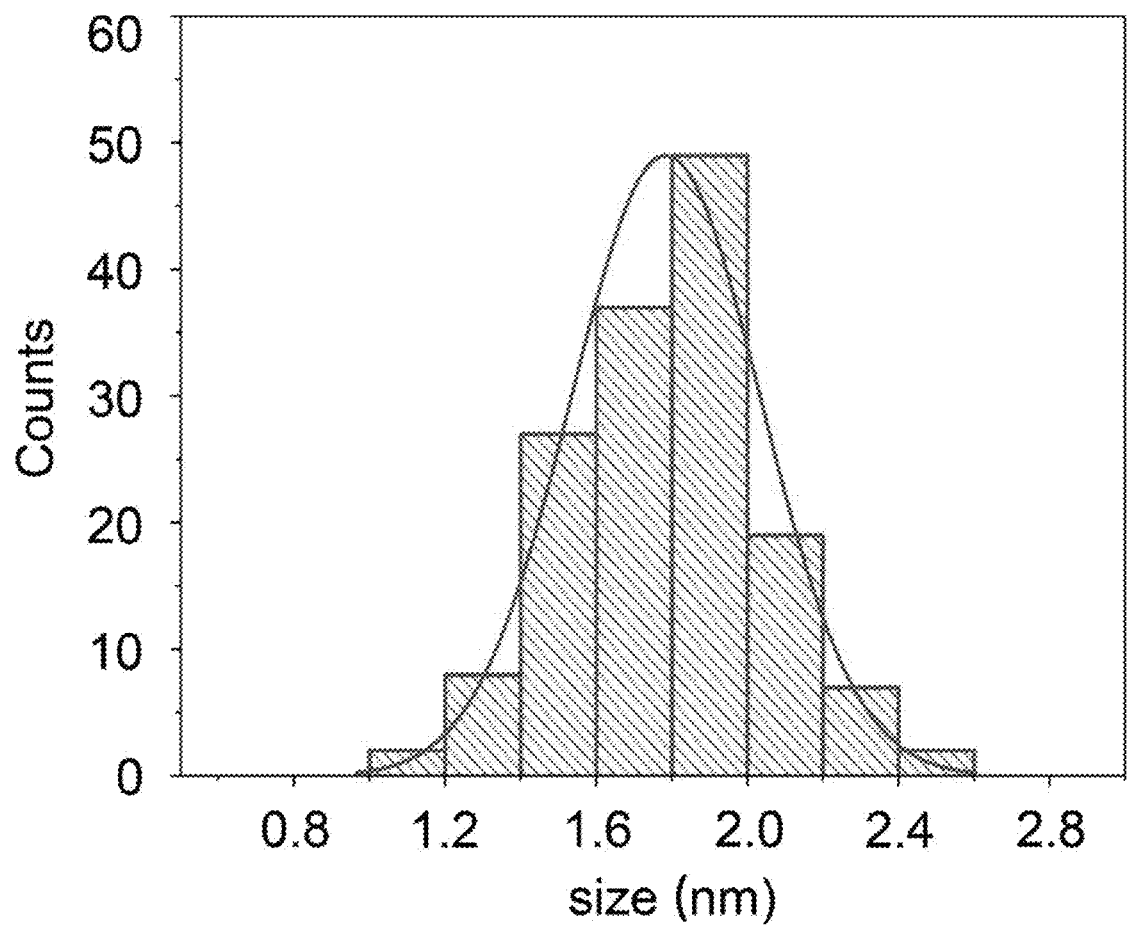
FIG. 5 shows a histogram of the particle size distribution of the $CeO_x$ nanoislands obtained by analyzing high resolution HAADF-STEM images.

FIG. 5 shows a histogram of the particle size distribution of the $CeO_x$ nanoglues obtained by analyzing high resolution HAADF-STEM images. The average size of the $CeO_x$ nanoglues is 1.8 nm.

Figure 6:
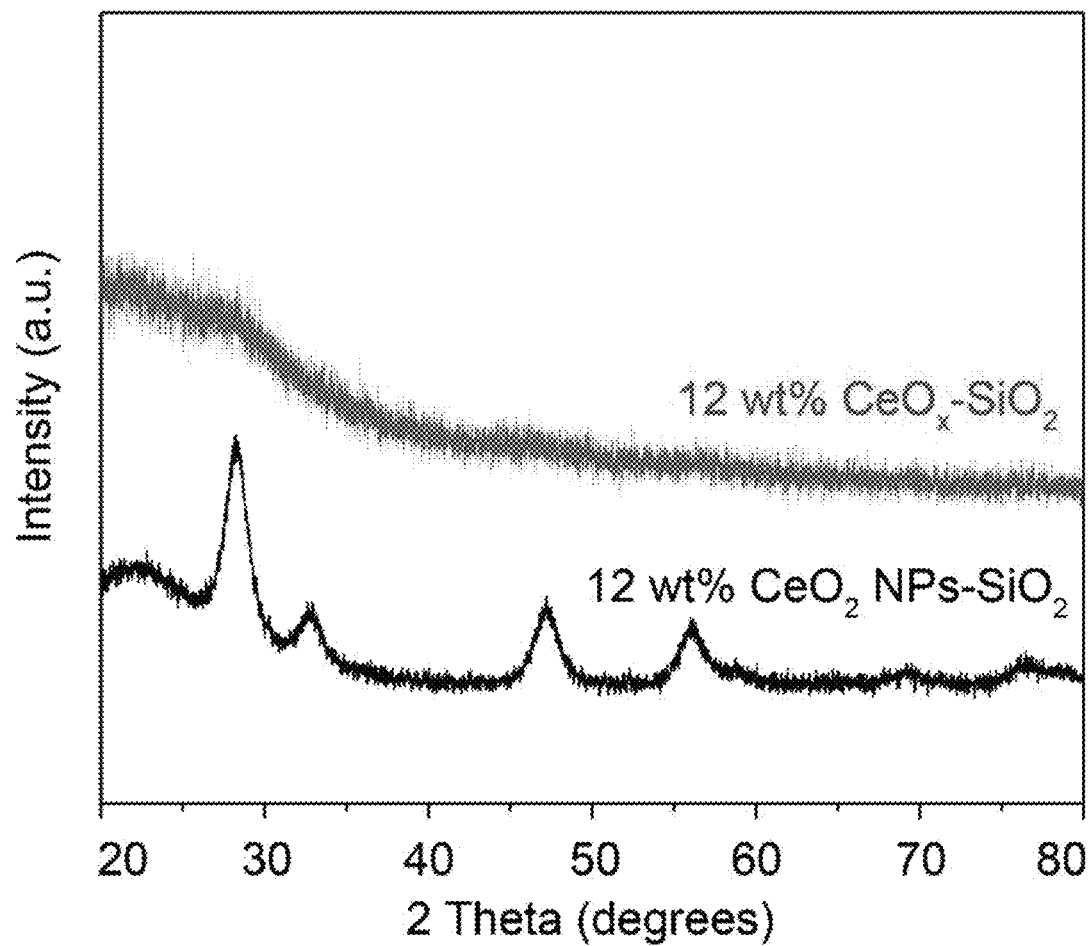
FIG. 6 shows powder X-ray diffraction (XRD) patterns obtained from 12 wt % $CeO_x$ nanoislands supported on $SiO_2$ and 12 wt % $CeO_2$ nanoparticles supported on $SiO_2$.

FIG. 6 shows powder X-ray diffraction (XRD) patterns obtained from defect-rich 12 wt % $CeO_x$ nanoglues (<3 nm) supported on $SiO_2$ and from stoichiometric 12 wt % $CeO_2$ nanoparticles (3-10 nm) supported on $SiO_2$. The sizes of the $CeO_x$ nanoglues are too small to give observable peaks in the XRD pattern while the larger $CeO_2$ nanocrystals show clearly recognizable peaks in the XRD pattern.

Figure 7A:
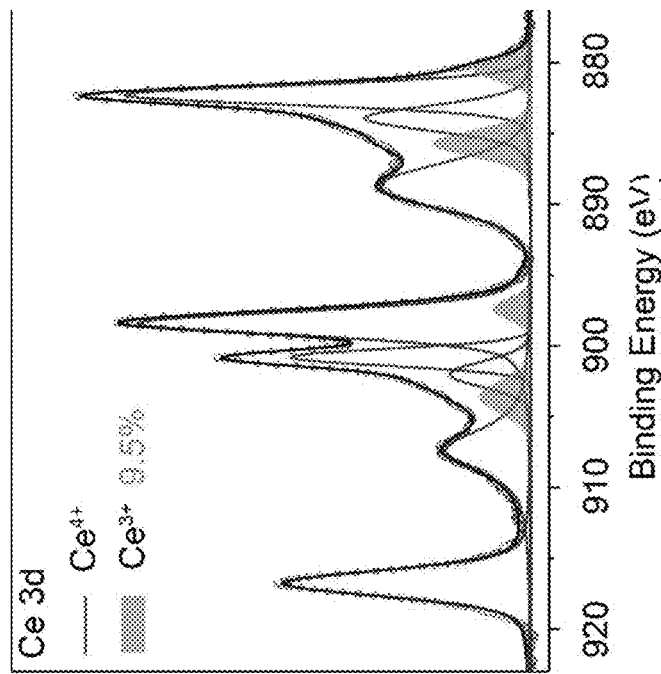
FIG. 7A shows Ce 3d X-ray photoelectron spectroscopy (XPS) spectra recorded over $SiO_2$ supported $CeO_x$ nanoislands.
Figure 7B:
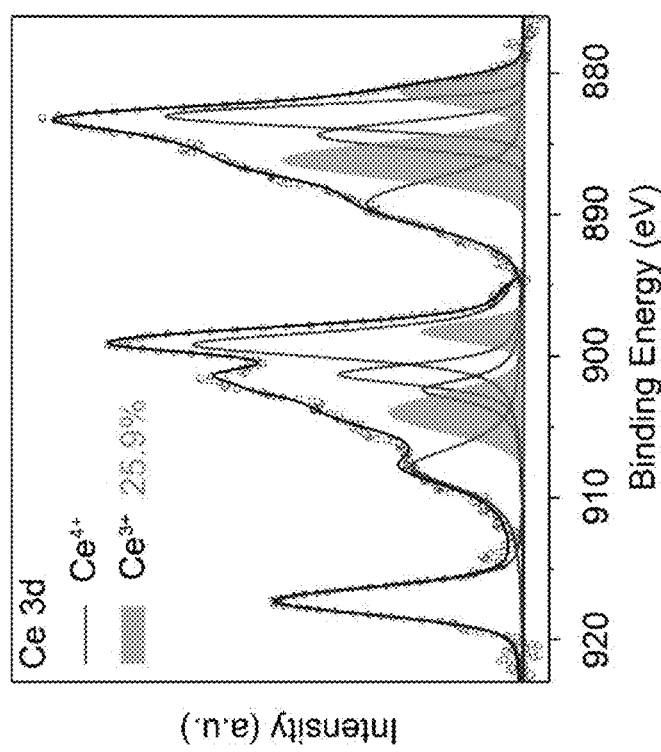
FIG. 7B shows Ce 3d XPS spectra recorded over $SiO_2$ supported $CeO_2$ nanoislands.

FIG. 7A shows Ce 3d X-ray photoelectron spectroscopy (XPS) spectra recorded over $SiO_2$ supported $CeO_x$ nanoglues. FIG. 7B show Ce 3d XPS spectra recorded over $SiO_2$ supported $CeO_2$ nanocrystals. The amount of $Ce^{3+}$, reflecting the defect state, is more dominant in the $CeO_x$ nanoglues (~26%) than that in the $CeO_2$ nanoparticles (~10%).

Figure 8:
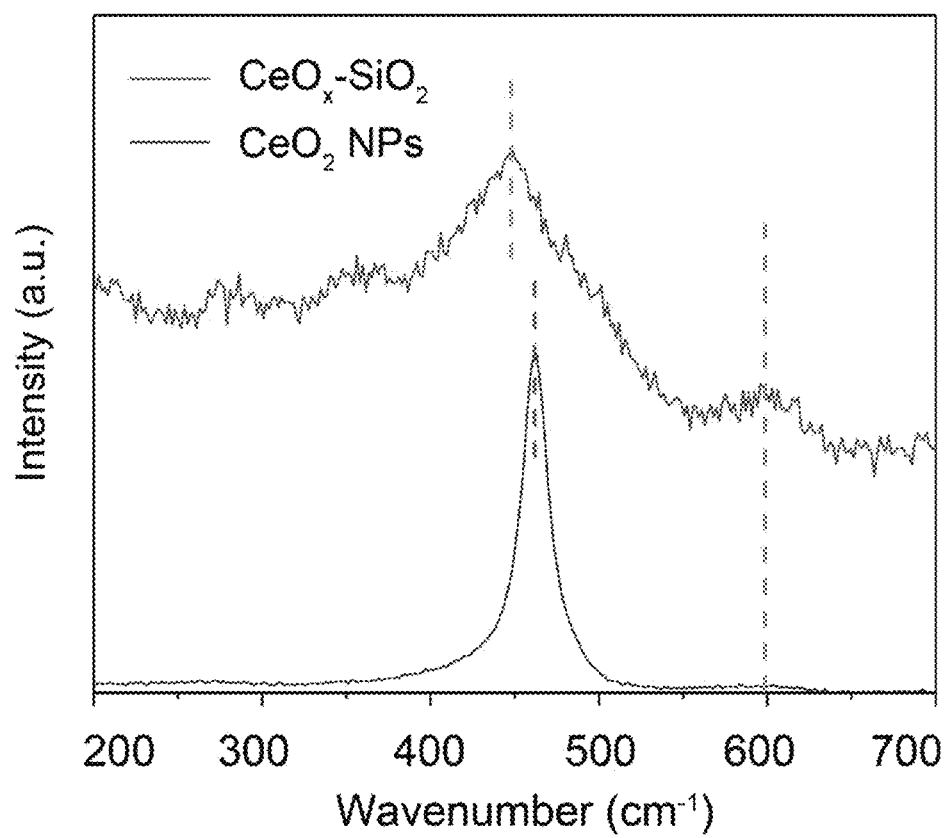
FIG. 8 shows Raman spectra obtained over $SiO_2$ supported $CeO_x$ and $CeO_2$ nanoislands.

FIG. 8 shows Raman spectra obtained over $SiO_2$ supported $CeO_x$ nanoglues (upper) and $CeO_2$ nanocrystals (lower). Compared to the peak at 462 $cm^{-1}$ of $CeO_2$ nanoparticles (NPs), the corresponding peak of the 12 wt % $CeO_x$—$SiO_2$ redshifts to 448 $cm^{-1}$ and becomes much broader, reflecting the increase in lattice constant due to their smaller sizes and the strong interaction between the $CeO_x$ nanoglues and the $SiO_2$ support.

FIG. 9A shows a representative low-magnification HAADF-STEM image of $CoO_x$ nanoislands 900 uniformly distributed throughout the high-surface-area $SiO_2$ support 902. FIG. 9B shows a representative high-magnification HAADF-STEM image of $CoO_x$ nanoislands 900 showing the shape, size, and spatial distribution of the $CoO_x$ nanoislands attached to the $SiO_2$ surfaces 902.

Figures 10A, 10B:
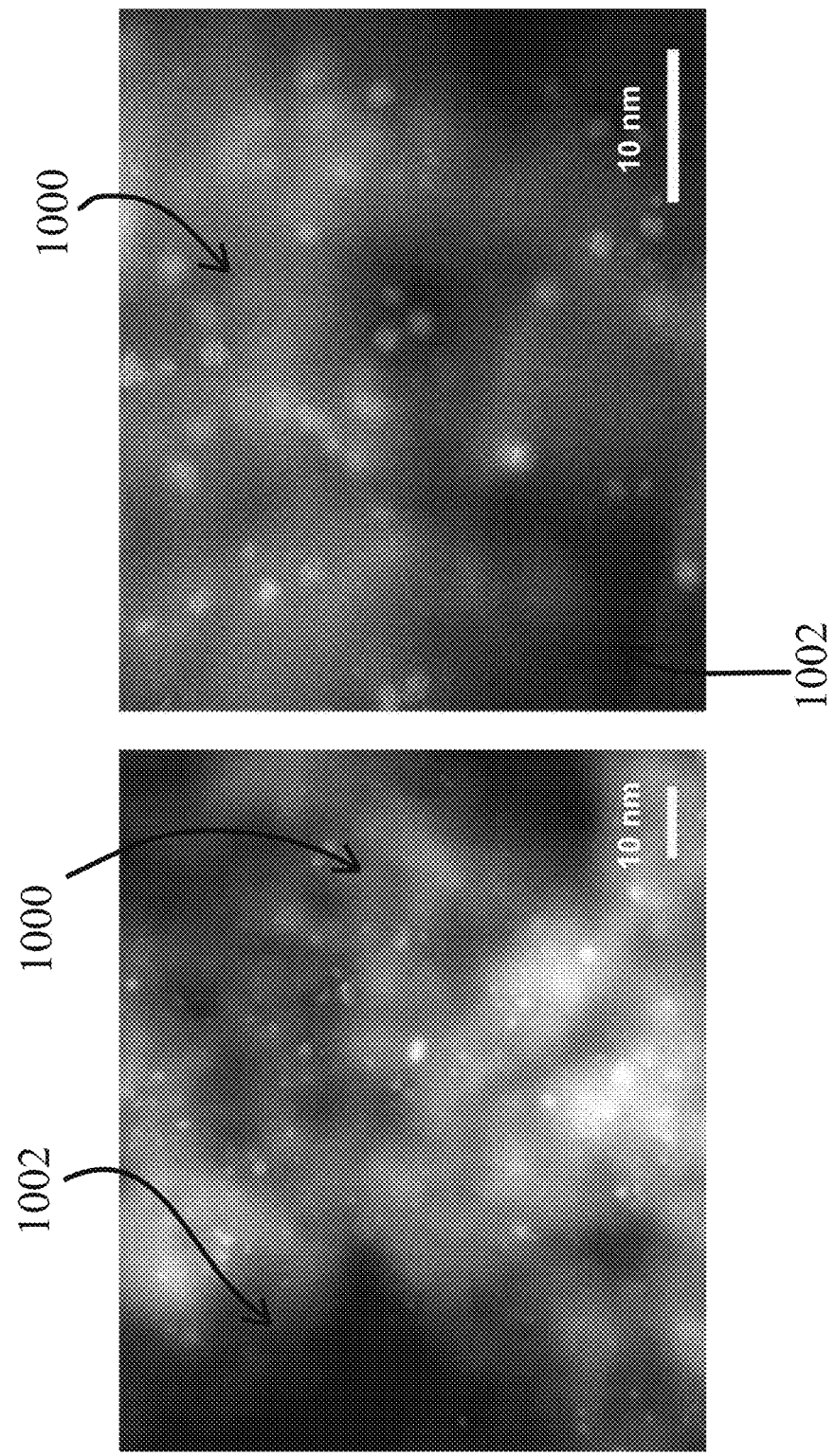
FIG. 10A shows a representative low-magnification HAADF-STEM image of $CuO_x$ nanoislands uniformly distributed throughout the high-surface-area $SiO_2$ support.
FIG. 10B shows a representative high-magnification HAADF-STEM image of $CuO_x$ nanoislands.

FIG. 10A shows a representative low-magnification HAADF-STEM image of $CuO_x$ nanoislands 1000 uniformly distributed throughout the high-surface-area $SiO_2$ support 1002. FIG. 10B shows a representative high-magnification HAADF-STEM image of $CuO_x$ nanoislands 1000 showing the shape, size, and spatial distribution of the $CuO_x$ nanoislands attached to the $SiO_2$ surfaces 1002.

Figures 11A, 11B:
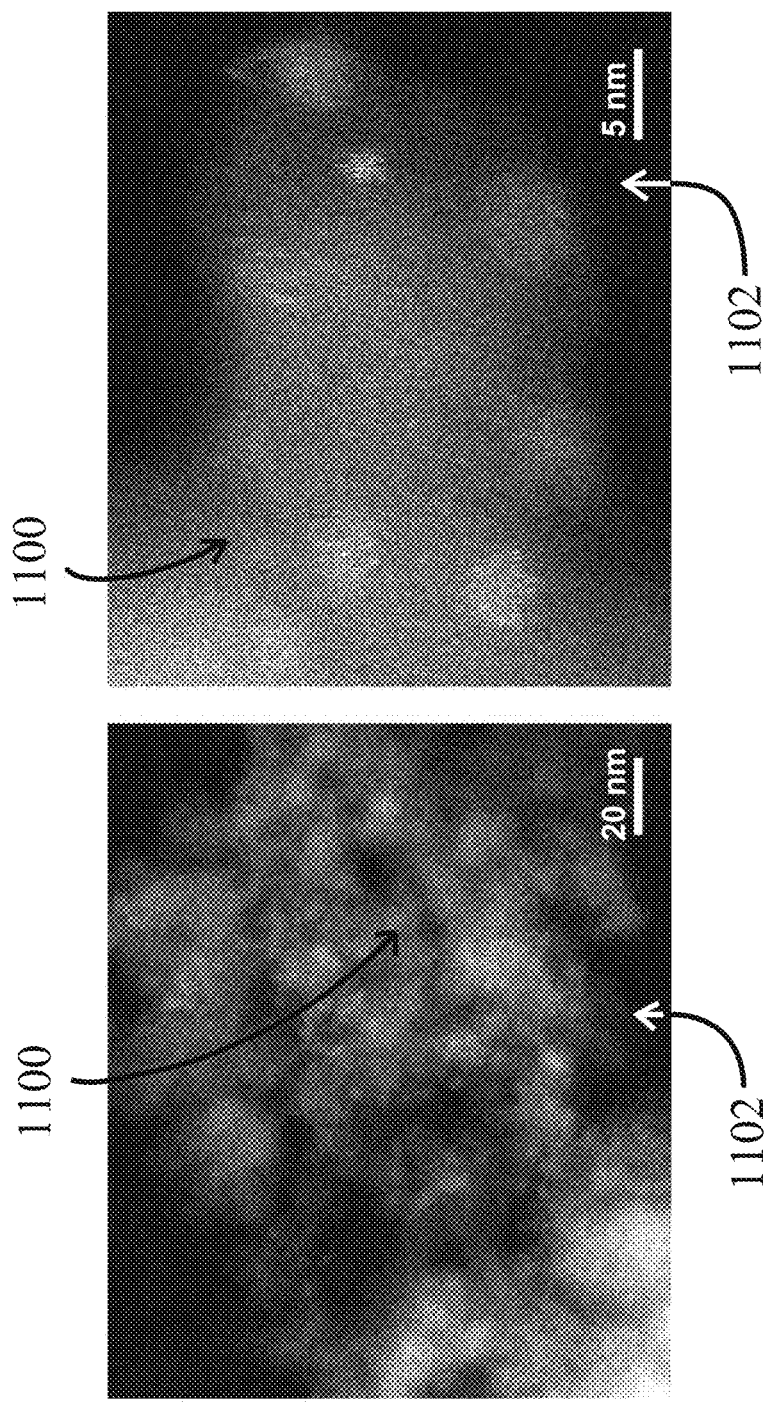
FIG. 11A shows a representative low-magnification HAADF-STEM image of $FeO_x$ nanoislands uniformly distributed throughout the high-surface-area $SiO_2$ support.
FIG. 11B shows a representative high-magnification HAADF-STEM image of $FeO_x$ nanoislands.

FIG. 11A shows a representative low-magnification HAADF-STEM image of $FeO_x$ nanoislands 1100 uniformly distributed throughout the high-surface-area $SiO_2$ support 1102. FIG. 11B shows a representative high-magnification HAADF-STEM image of $FeO_x$ nanoislands 1100 showing the shape, size, and spatial distribution of the $FeO_x$ nanoislands attached to the $SiO_2$ surface 1102.

FIG. 12A shows a representative low-magnification HAADF-STEM image of a typical $Pt_1$/$CeO_x$—$SiO_2$ single-atom catalyst 1200 revealing the absence of Pt nanoparticles and nanoclusters. FIG. 12B shows a representative high-magnification HAADF-STEM image of a typical $Pt_1$/$CeO_x$—$SiO_2$ single-atom catalyst 1202 showing the absence of Pt nanoparticles and nanoclusters. Single Pt atoms cannot be reliably imaged because of the lack of image contrast since the atomic number differences between Pt and Ce is not large enough and that the thicknesses of the $CeO_x$ nanoislands change rapidly.

Figures 13A, 13B:
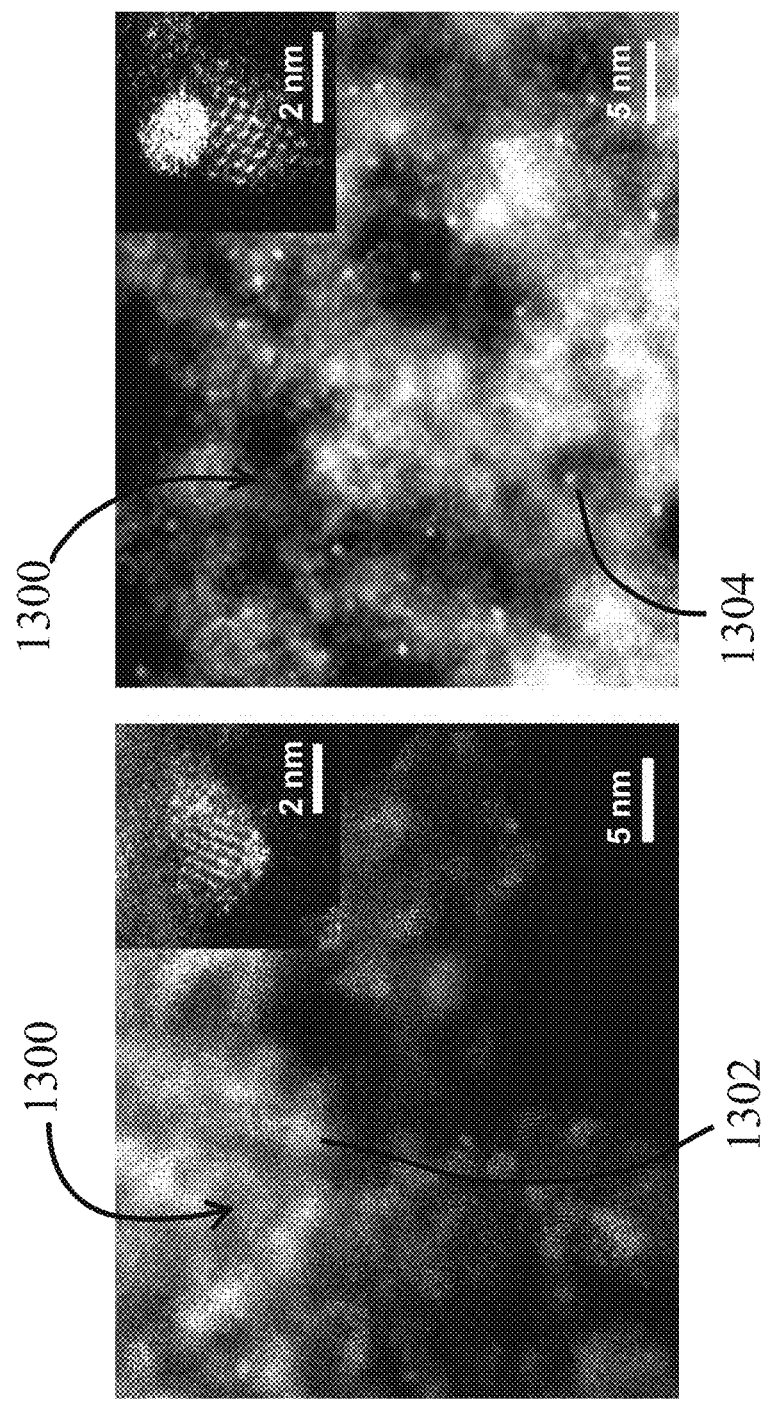
FIG. 13A shows a representative HAADF-STEM image of a typical $CeO_x$—$SiO_2$ supported Pt cluster catalyst.
FIG. 13B shows a representative HAADF-STEM image of a typical $CeO_x$—$SiO_2$ supported Pt nanoparticle catalyst.

FIG. 13A shows a representative HAADF-STEM image of a typical $CeO_x$—$SiO_2$ supported Pt cluster catalyst 1300 revealing the presence of many Pt nanoclusters 1302 with sizes ranging from ~0.4 nm to 1.0 nm. FIG. 13B shows a representative HAADF-STEM image of a typical $CeO_x$—$SiO_2$ supported Pt nanoparticle catalyst 1300 showing the presence of many Pt nanoparticles 1304 with sizes ranging from ~0.5 nm to 2.0 nm.

Figure 14B:
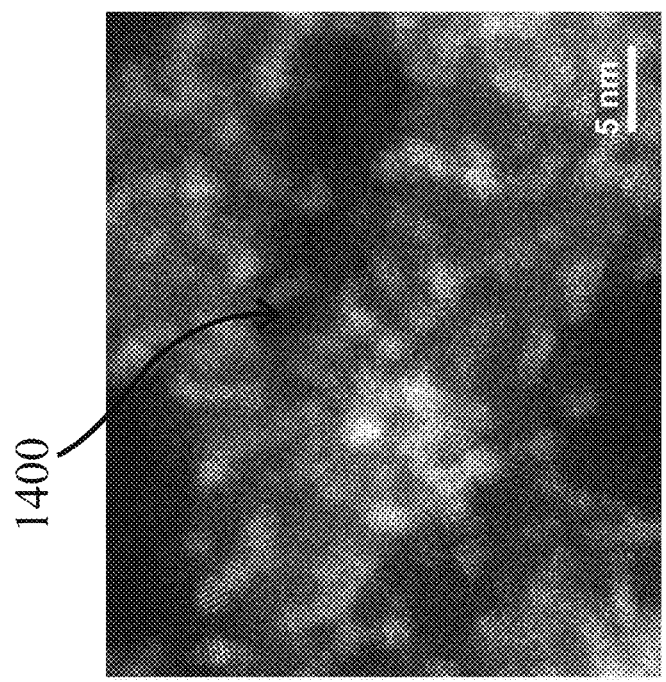
FIG. 14B shows a representative high-magnification HAADF-STEM image of a typical $Pd_1/CeO_x$—$SiO_2$ single-atom catalyst showing the absence of Pd nanoparticles and nanoclusters.
Figure 14A:
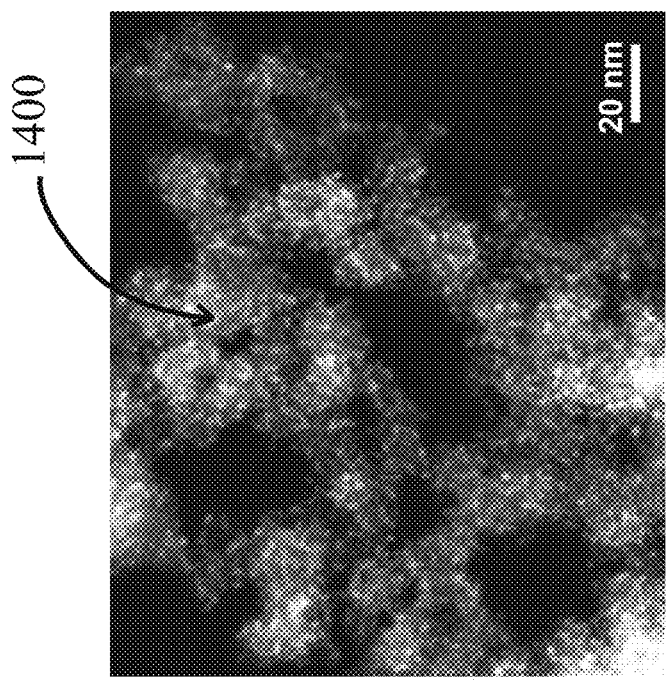
FIG. 14A shows a representative low-magnification HAADF-STEM image of a typical $Pd_1/CeO_x$—$SiO_2$ single-atom catalyst showing the absence of Pd nanoparticles and nanoclusters.

FIG. 14A shows a representative low-magnification HAADF-STEM image of a typical $Pd_1$/$CeO_x$—$SiO_2$ single-atom catalyst 1400 showing the absence of Pd nanoparticles and nanoclusters. FIG. 14B shows a representative high-magnification HAADF-STEM image of a typical $Pd_1$/$CeO_x$—$SiO_2$ single-atom catalyst 1400 showing the absence of Pd nanoparticles and nanoclusters. Single Pd atoms cannot be reliably imaged because of the lack of image contrast since the atomic number differences between Pd and Ce is small and that the thicknesses of the $CeO_x$ nanoislands change rapidly.

CO Oxidation Reaction

The CO oxidation reaction over the fabricated catalysts was conducted in a fixed-bed plug-flow reactor at atmospheric pressure. Typically, 30 mg of catalyst was used for each catalytic test. For CO oxidation, the reaction temperature was ramped up with a heating rate of 1° C./min. The feed gas, containing 1 vol % CO, 4 vol % $O_2$ balanced with He, passed through the catalytic bed at a flow rate of 10.0 mL/min (corresponding to weight hourly space velocity (WHSV) of 20,000 mL/g·h). Outlet gas composition was measured by an online gas chromatograph (Agilent 7890A) equipped with a thermal conductivity detector (TCD).

Figure 15:
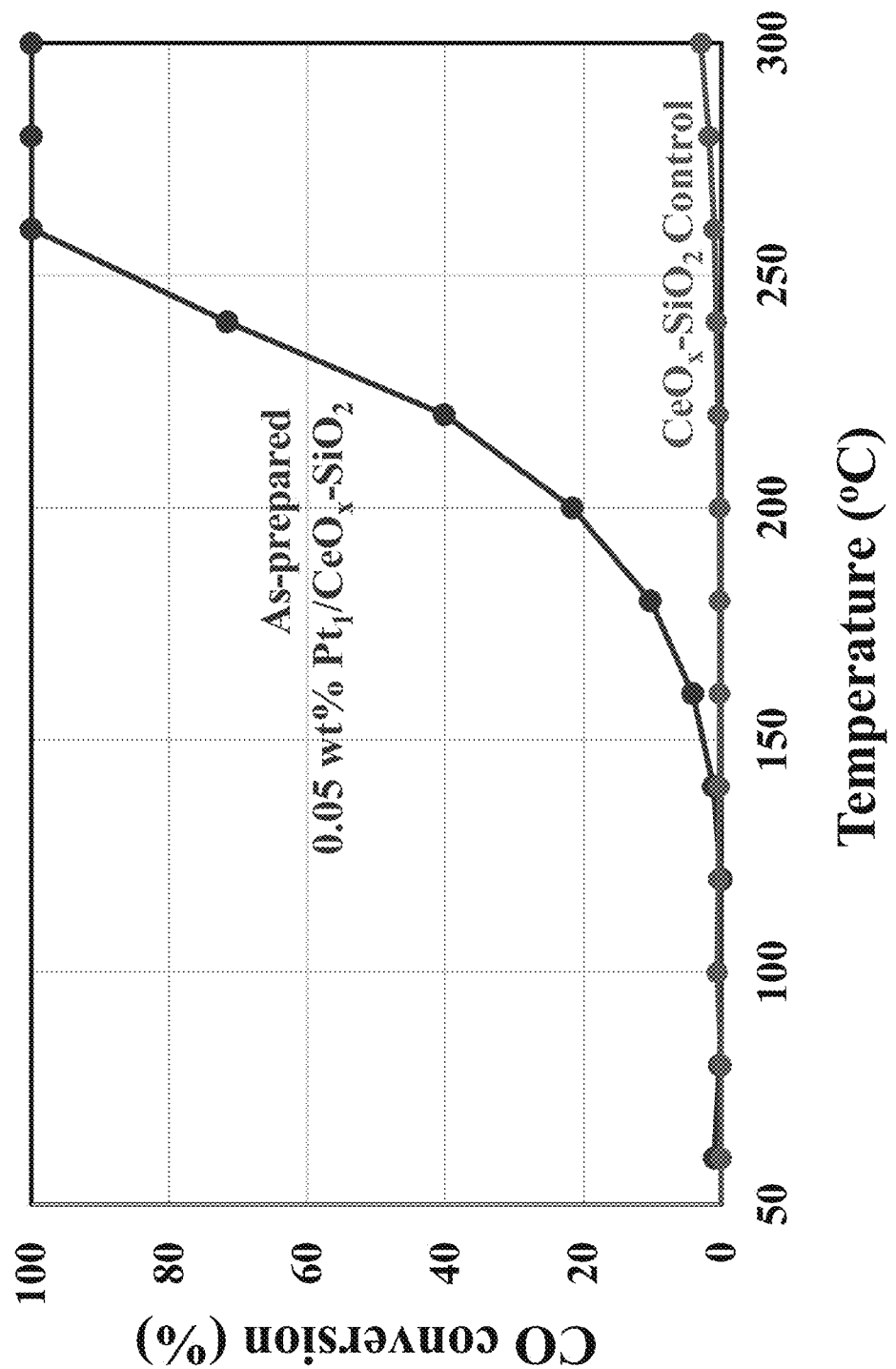
FIG. 15 shows conversion rate of CO oxidation over the 0.05 wt % $Pt_1/CeO_x$—$SiO_2$ single-atom catalyst and the $CeO_x$—$SiO_2$ support control.

FIG. 15 shows conversion rate of CO oxidation over the 0.05 wt % $Pt_1$/$CeO_x$—$SiO_2$ single-atom catalyst and the $CeO_x$—$SiO_2$ support control. Reaction conditions: 1 vol % CO and 4 vol % $O_2$ balanced with He, pressure=0.1 MPa, space velocity=20,000 mL/g·h. The high CO oxidation activity originates from the Pt single atoms.

Figure 16:
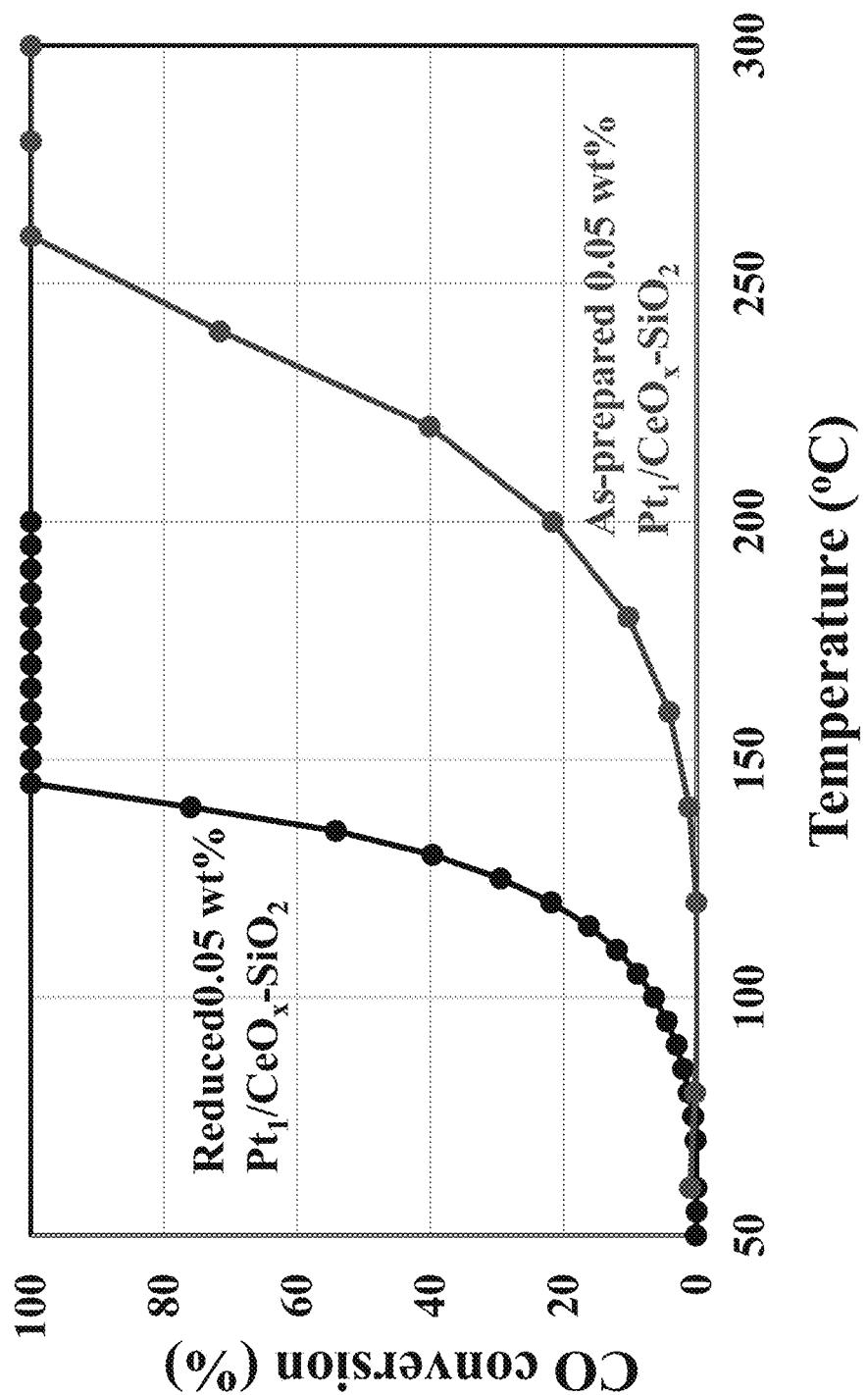
FIG. 16 shows conversion rate of CO oxidation over the 0.05 wt % $Pt_1/CeO_x$—$SiO_2$ before and after $H_2$ reduction treatment.

FIG. 16 shows conversion rate of CO oxidation over the 0.05 wt % $Pt_1$/$CeO_x$—$SiO_2$ before and after $H_2$ reduction treatment. Reaction conditions: 1 vol % CO and 4 vol % $O_2$ balanced with He, pressure=0.1 MPa, SV=20,000 mL/g·h. The $H_2$ reduction process removes some oxygen ligands which are weakly bound to the Pt atoms. The reduction of the oxidation state of the Pt atoms promoted their CO oxidation activity. The modification of the $CeO_x$ by the $H_2$ reduction treatment may affect the observed CO oxidation activity as well.

Figure 17:
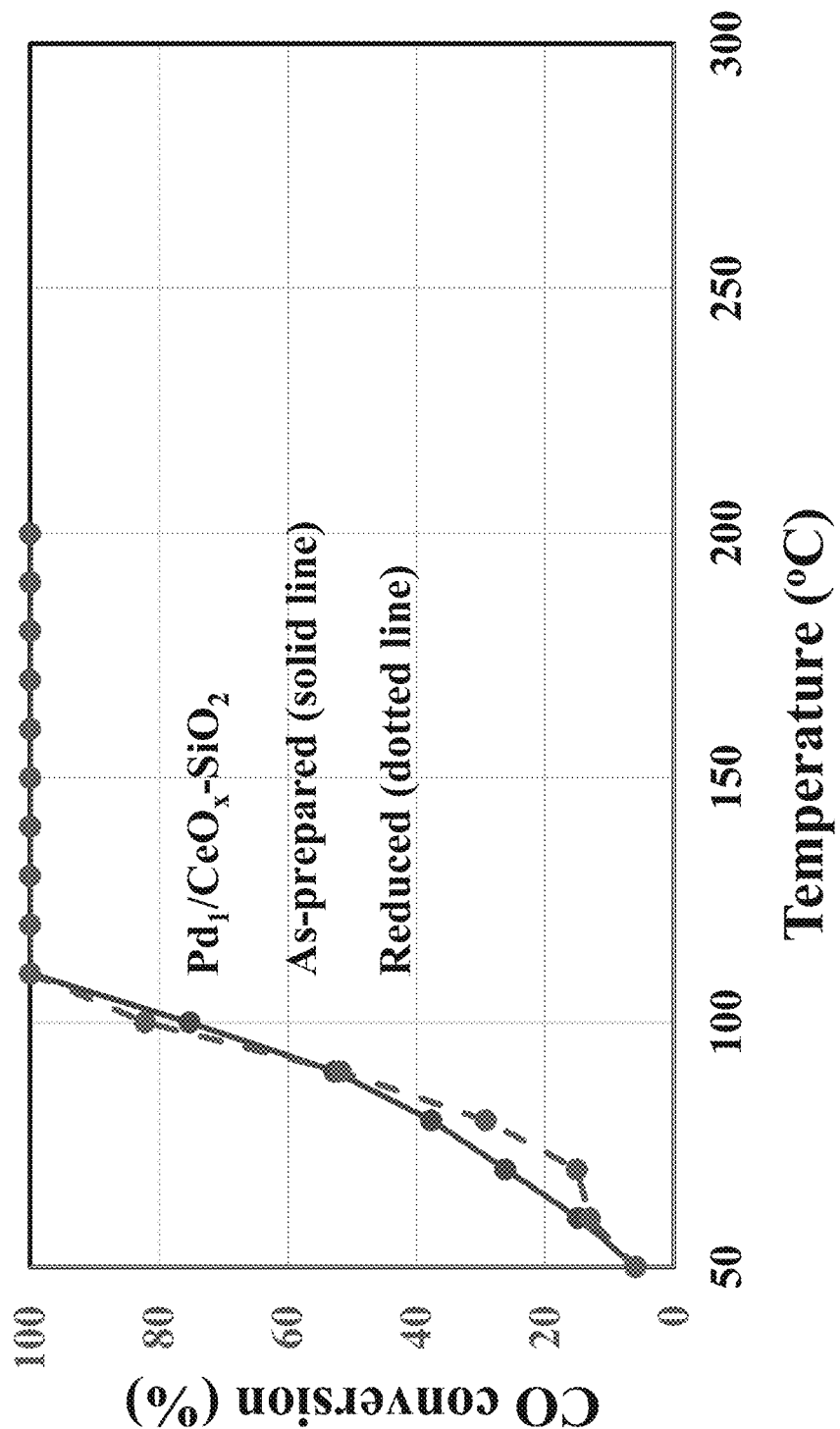
FIG. 17 shows conversion rate of CO oxidation over the 0.05 wt % $Pd_1/CeO_x$—$SiO_2$ before and after $H_2$ reduction treatment.

FIG. 17 shows conversion rate of CO oxidation over the 0.05 wt % $Pd_1$/$CeO_x$—$SiO_2$ before and after $H_2$ reduction treatment. Reaction conditions: 1 vol % CO and 4 vol % $O_2$ balanced in He, pressure=0.1 MPa, SV=20,000 mL/g·h. The calcined 0.05 wt % $Pd_1$/$CeO_x$—$SiO_2$ single-atom catalyst is intrinsically active for CO oxidation. The $H_2$ reduction process did not appreciably change the CO oxidation activity.

Figure 18:
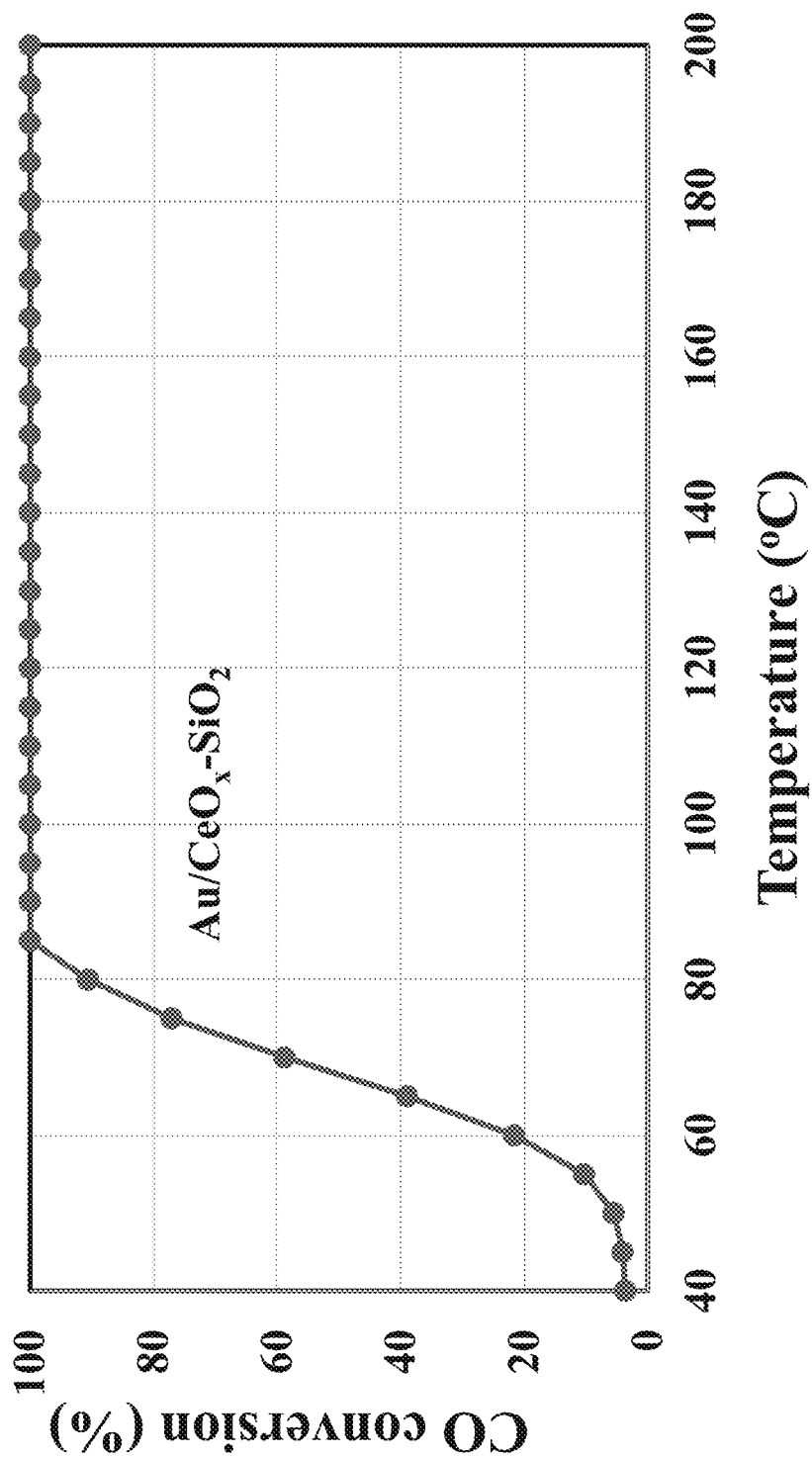
FIG. 18 shows conversion rate of CO oxidation over Au/$CeO_x$—$SiO_2$ catalyst.

FIG. 18 shows conversion rate of CO oxidation over Au/$CeO_x$—$SiO_2$ catalyst. Reaction conditions: 1 vol % CO and 4 vol % $O_2$ balanced with He, pressure=0.1 MPa, SV=20,000 mL/g·h.

Figure 19:
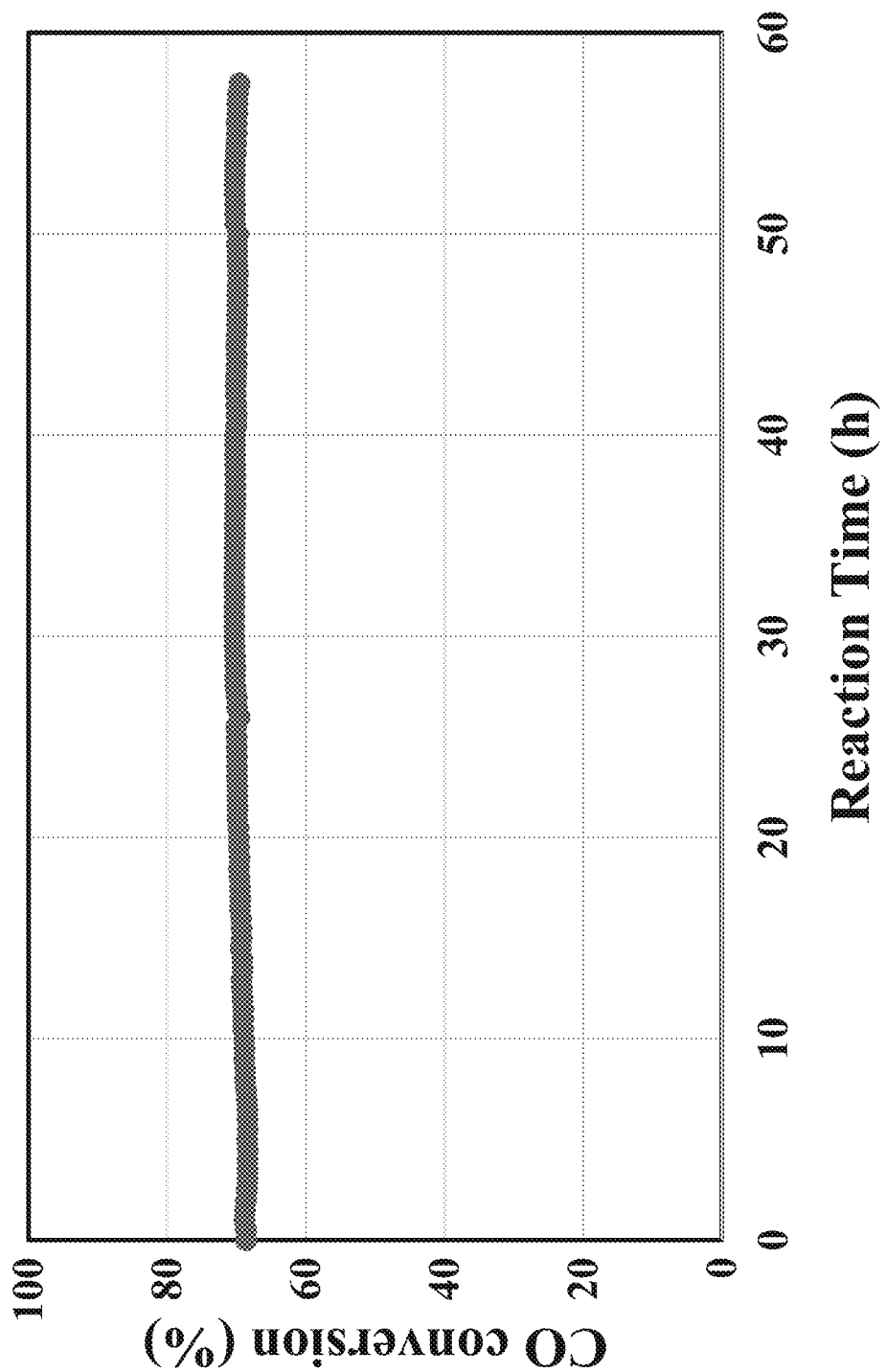
FIG. 19 shows a stability test of CO oxidation over the 0.05 wt % $Pt_1/CeO_x$—$SiO_2$ single-atom catalyst.

FIG. 19 shows a stability test of CO oxidation over the 0.05 wt % $Pt_1$/$CeO_x$—$SiO_2$ single-atom catalyst. The CO oxidation reaction was conducted at 140° C. The 0.05 wt % $Pt_1$/$CeO_x$—$SiO_2$ single-atom catalyst did not show any trend of deactivation during the long-term test. Reaction conditions: 1 vol % CO and 4 vol % $O_2$ balanced with He, pressure=0.1 MPa, SV=20,000 mL/g·h.

Figure 20:
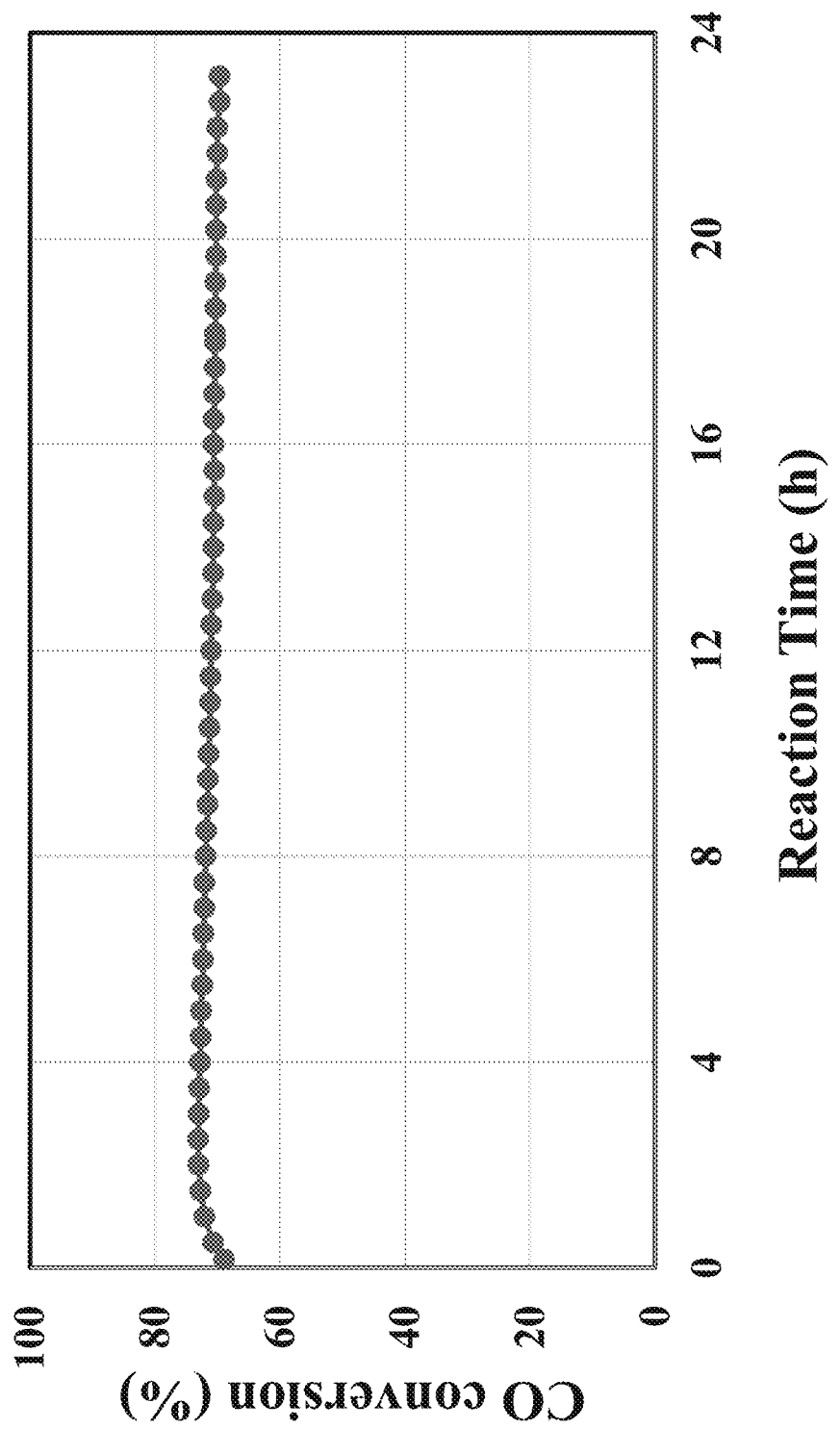
FIG. 20 shows a stability test for CO oxidation over the 0.05 wt % $Pd_1/CeO_x$—$SiO_2$ single-atom catalyst.

FIG. 20 shows a stability test for CO oxidation over the 0.05 wt % $Pd_1/CeO_x$—$SiO_2$ single-atom catalyst. The CO oxidation reaction was conducted at 120° C. Reaction conditions: 1 vol % CO and 4 vol % $O_2$ balanced with He, pressure=0.1 MPa, SV=20,000 mL/g·h.

Figure 21:
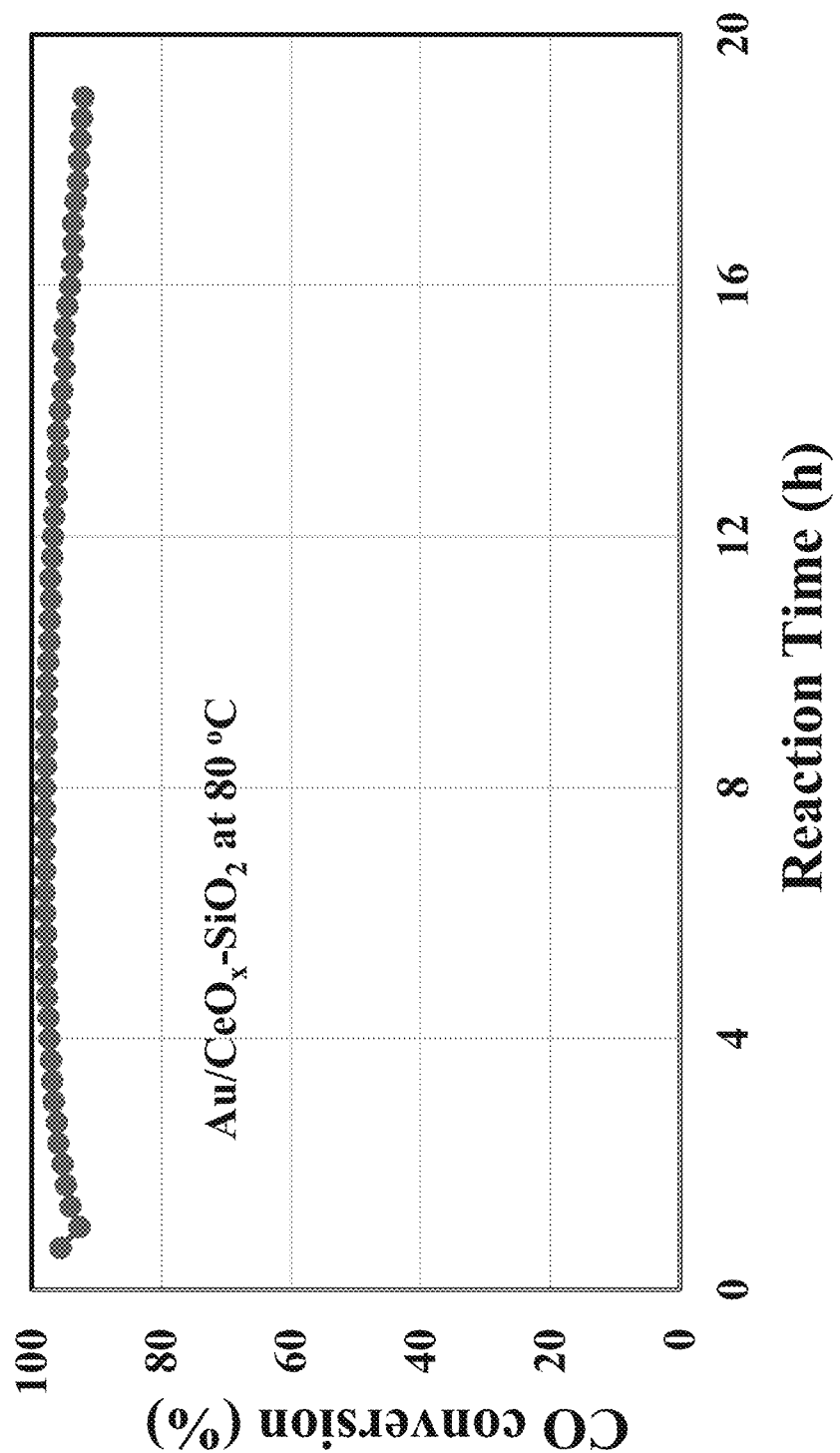
FIG. 21 shows a stability test for CO oxidation over the Au/$CeO_x$—$SiO_2$ catalyst.

FIG. 21 shows a stability test for CO oxidation over the $Au/CeO_x$—$SiO_2$ catalyst. The CO oxidation reaction was conducted at 80° C. Reaction conditions: 1 vol % CO and 4 vol % $O_2$ balanced with He, pressure=0.1 MPa, SV=20,000 mL/g·h.

Water-Gas-Shift Reaction (WGS)

The WGS reaction over the fabricated catalysts was conducted in a fixed-bed plug-flow reactor at atmospheric pressure. Typically, 30 mg of catalyst was used for each test. Catalyst powders were pretreated in 10 sccm (standard cubic centimeter per minute) of 5% $H_2$/He at 300° C. for 1 h. The reaction temperature was ramped up with a heating rate of 2° C./min. The feed gas, containing 1 vol % CO balanced with He, passed through a water reservoir which was heated to 33° C. The gas mixture went through the catalytic bed at a flow rate of 10.0 mL/min (corresponding to a weight hourly space velocity (WHSV) of 20,000 mL/g·h). Outlet gas composition was measured by an online gas chromatograph (Agilent 7890A) equipped with a thermal conductivity detector (TCD).

Figure 22:
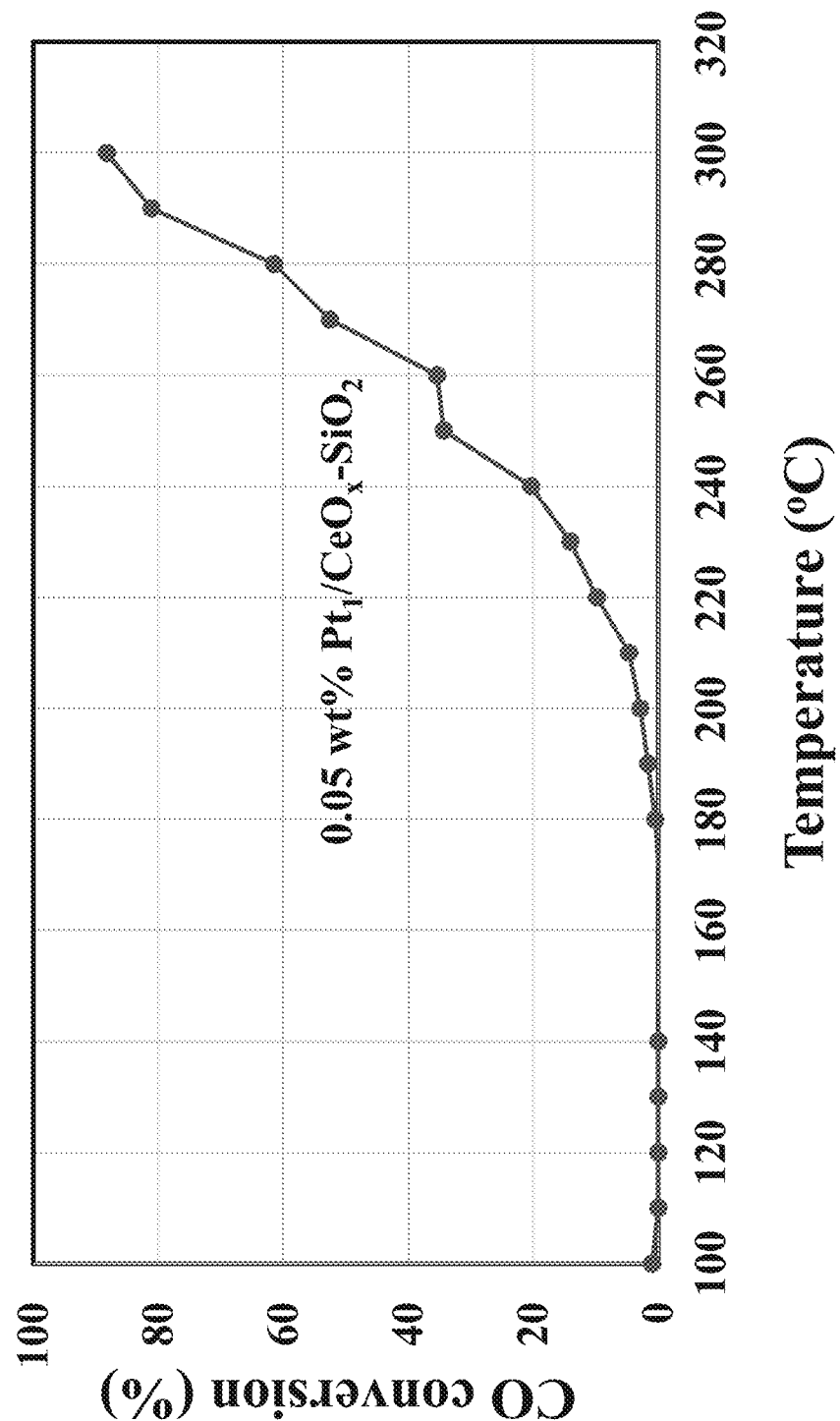
FIG. 22 shows a conversion rate of water-gas-shift reaction (WGS) over the 0.05 wt % $Pt_1/CeO_x$—$SiO_2$ single-atom catalyst.

FIG. 22 shows conversion rate of WGS reaction over the 0.05 wt % $Pt_1/CeO_x$—$SiO_2$ single-atom catalyst. Reaction conditions: 1 vol % CO and 5 vol % $H_2O$ balanced with He, pressure=0.1 MPa, space velocity=20,000 mL/g·h.

Figure 23:
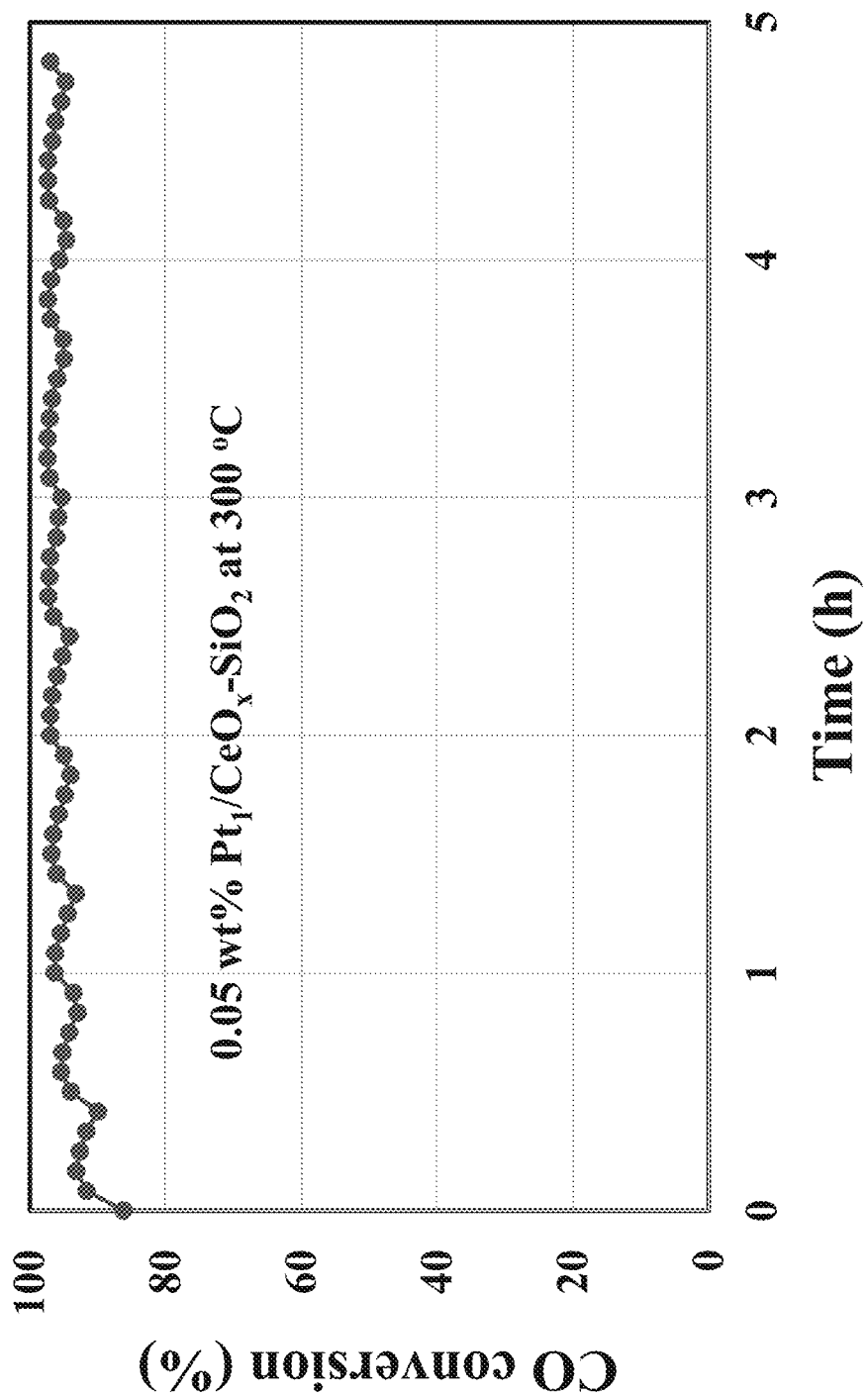
FIG. 23 shows a stability test of WGS over the 0.05 wt % $Pt_1/CeO_x$—$SiO_2$ single-atom catalyst.

FIG. 23 shows a stability test of WGS over the 0.05 wt % $Pt_1/CeO_x$—$SiO_2$ single-atom catalyst. The WGS reaction was conducted at 300° C. Reaction conditions: 1 vol % CO and 5 vol % $H_2O$ balanced with He, pressure=0.1 MPa, space velocity=20,000 mL/g·h.

Methane Combustion Reaction

The methane combustion reaction over the fabricated catalysts was conducted in a fixed-bed plug-flow reactor at atmospheric pressure. Typically, 30 mg of catalyst was used for each test. Before reaction test, the catalyst was pretreated with 10 sccm (standard cubic centimeter per minute) of 5% $H_2$/He at 300° C. for 1 h. For methane combustion, the reaction temperature was ramped up with a heating rate of 1° C./min. The feed gas, containing 1 vol % $CH_4$, 4 vol % $O_2$ balanced with He, passed through the catalytic bed at a flow rate of 10.0 mL/min (corresponding to a weight hourly space velocity of 20,000 mL/g·h). Outlet gas composition was measured by an online gas chromatograph (Agilent 7890A) equipped with a thermal conductivity detector (TCD).

Methanol Reforming Reaction

The methanol reforming reaction over the synthesized catalysts was conducted in a fixed-bed flow reactor at atmospheric pressure. Typically, 30 mg of catalyst was used for each test. Before reaction, the catalyst was pretreated with 10 sccm (standard cubic centimeter per minute) of 5% $H_2$/He at 300° C. for 1 h. For methanol reforming reaction, the reaction temperature was ramped up with a heating rate of 1° C./min. The feed gas, containing 10 vol % $CH_3OH$, 7 vol % $H_2O$ balanced with He, passed through the catalytic bed at a flow rate of 10.0 mL/min (corresponding to weight hourly space velocity of 20,000 mL/g·h). Outlet gas composition was measured by an online gas chromatograph (Agilent 7890A) equipped with a thermal conductivity detector (TCD).

Figure 24:
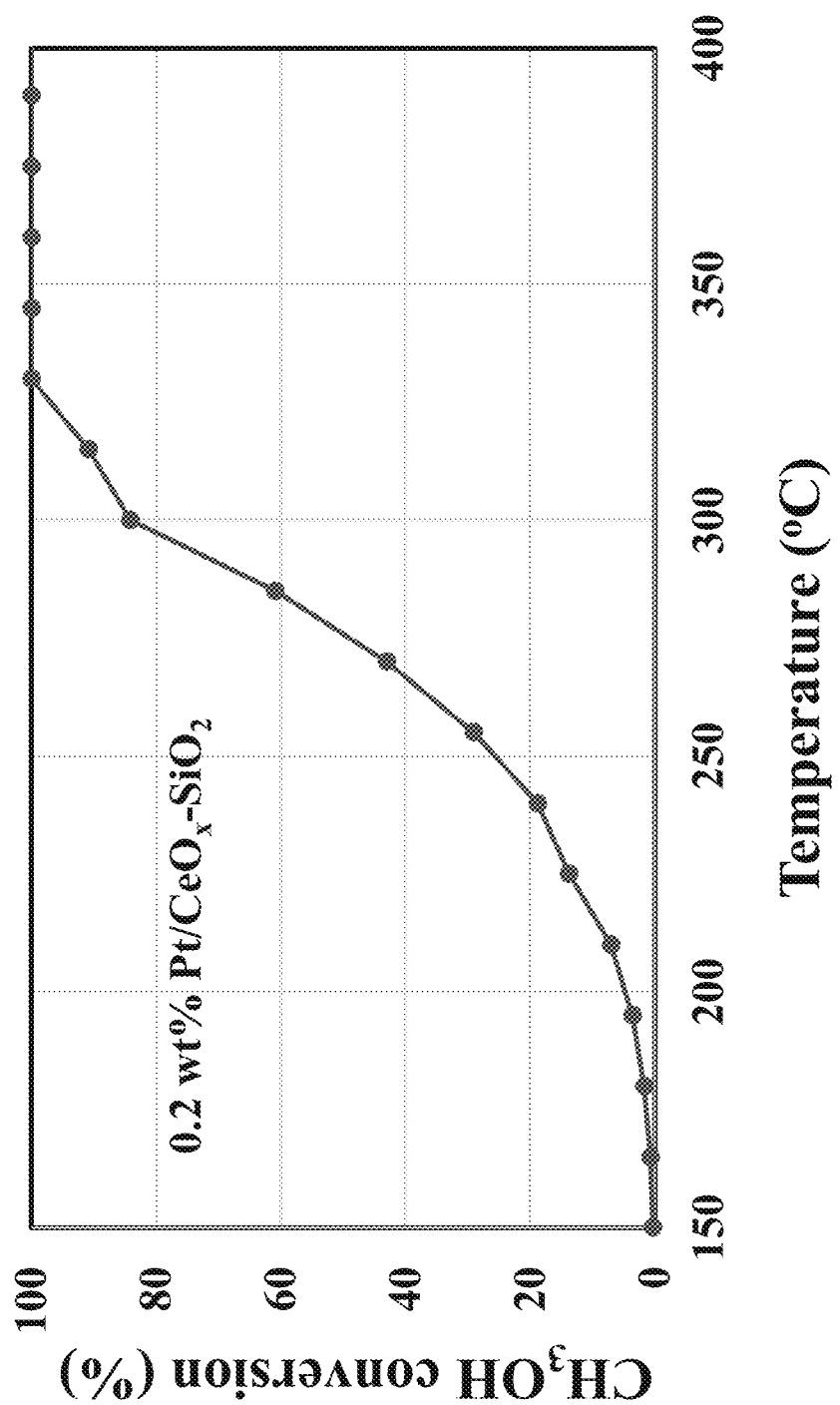
FIG. 24 shows a conversion rate for methanol steam reforming over the 0.2 wt % Pt/$CeO_x$—$SiO_2$ catalyst.

FIG. 24 shows a conversion rate for methanol steam reforming over the 0.2 wt % $Pt/CeO_x$—$SiO_2$ catalyst. Reaction conditions: 1 vol % methanol and 1 vol % $H_2O$ balanced with He, pressure=0.1 MPa, space velocity=20,000 mL/g·h.

Figure 25A:
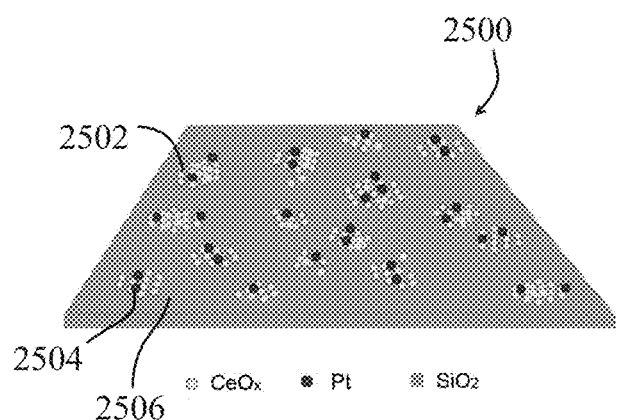
FIG. 25A depicts high-number density of $Pt_1$ atoms supported on $CeO_x$—$SiO_2$ nanoislands which are supported on high-surface-area refractory material.

Synthesis of $CeO_x$—$SiO_2$ $CeO_x$ clusters were used as nanoglues to anchor Pt single atoms onto high surface area, inexpensive, and abundant $SiO_2$ supports, as depicted in FIG. 25A. The highly reducible $CeO_x$ clusters act as an oxygen gateway to store/release oxygen during selected catalytic reactions. CO oxidation was used as a probe reaction to test the catalytic performance of $Pt_1/CeO_x$ clusters dispersed onto $SiO_2$ nanoparticles.

180 mg of fumed $SiO_2$ powder (surface area of 278 $m^2/g$) was mixed with 50 mL of water and then sonicated to obtain a uniform suspension. Under rigorous stirring, 86 mg of $Ce(NO_3)_3 \cdot 6H_2O$ was added into the $SiO_2$ solution. Subsequently, 0.4 mL of $NH_3$—$H_2O$ (concentration 2 mol/L) was quickly injected into the mixed solution. After stirring for 3 min, the mixture was collected by vacuum filtration. The resultant light-brown Ce—$SiO_2$ precipitate was dried in air overnight at room temperature. The dried powder was ground with a pestle and then annealed at 600° C. for 12 h in a muffle furnace to obtain the light-yellow colored CeO—$SiO_2$ powders. The loading of the $CeO_x$ was 12 wt % by inductively coupled plasma mass spectrometry (ICP-MS) measurement. Through the same procedure, the 6 wt % CeO—$SiO_2$ was synthesized by using 43 mg of $Ce(NO_3)_3 \cdot 6H_2O$ and 0.2 mL of ammonia (2 mol/L). This synthesis process was successfully scaled up to 10 times, in which 1800 mg of $SiO_2$, 500 mL of $H_2O$, 860 mg of $Ce(NO_3)_3 \cdot 6H_2O$ and 4 mL of $NH_3$—$H_2O$ were used, respectively.

A strong electrostatic adsorption method was used to disperse Pt salt precursors onto the surfaces of the as-prepared $CeO_x$—$SiO_2$ nanocomposite powders. The $Pt/CeO$—$SiO_2$ precipitates were then filtered, washed and dried at 60° C. for 5 h. The $Pt_1/CeO_x$—$SiO_2$ powders, with a nominal loading of 0.05 wt. % of Pt, were calcined and/or reduced to form the final $Pt_1$ SACs.

Figure 25B:
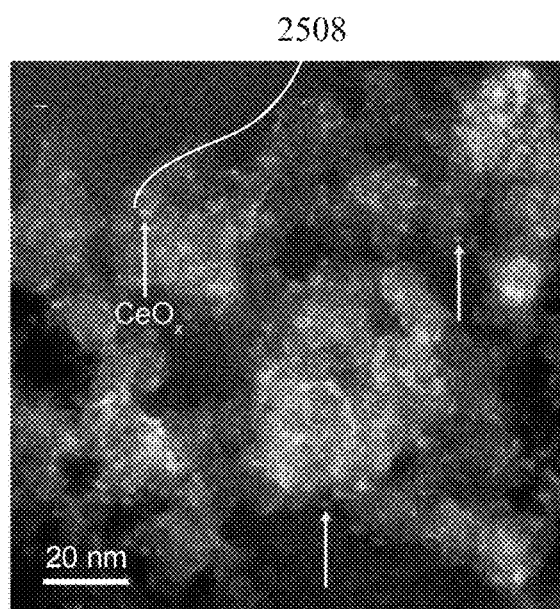
FIG. 25B shows HAADF-STEM images of a typical $Pt_1/CeO_x$—$SiO_2$ single-atom catalyst showing spatial distribution of the $CeO_x$ nanoislands.
Figure 25C:
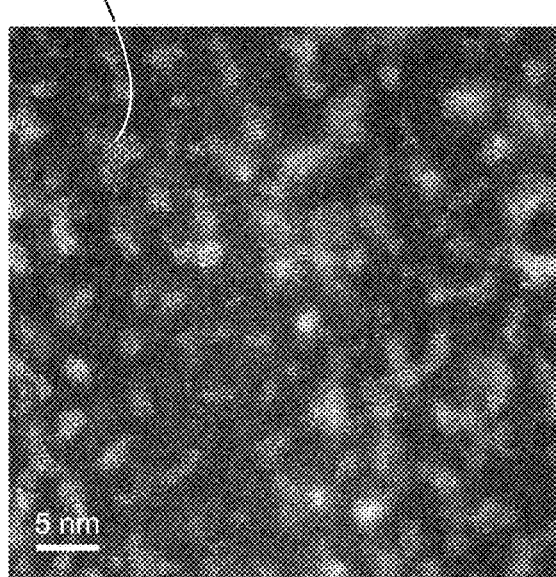
FIG. 25C shows the atomic structure of the $CeO_x$ clusters. The $Pt_1$ atoms cannot be reliably identified due to lack of proper image contrast.
Figure 25D:
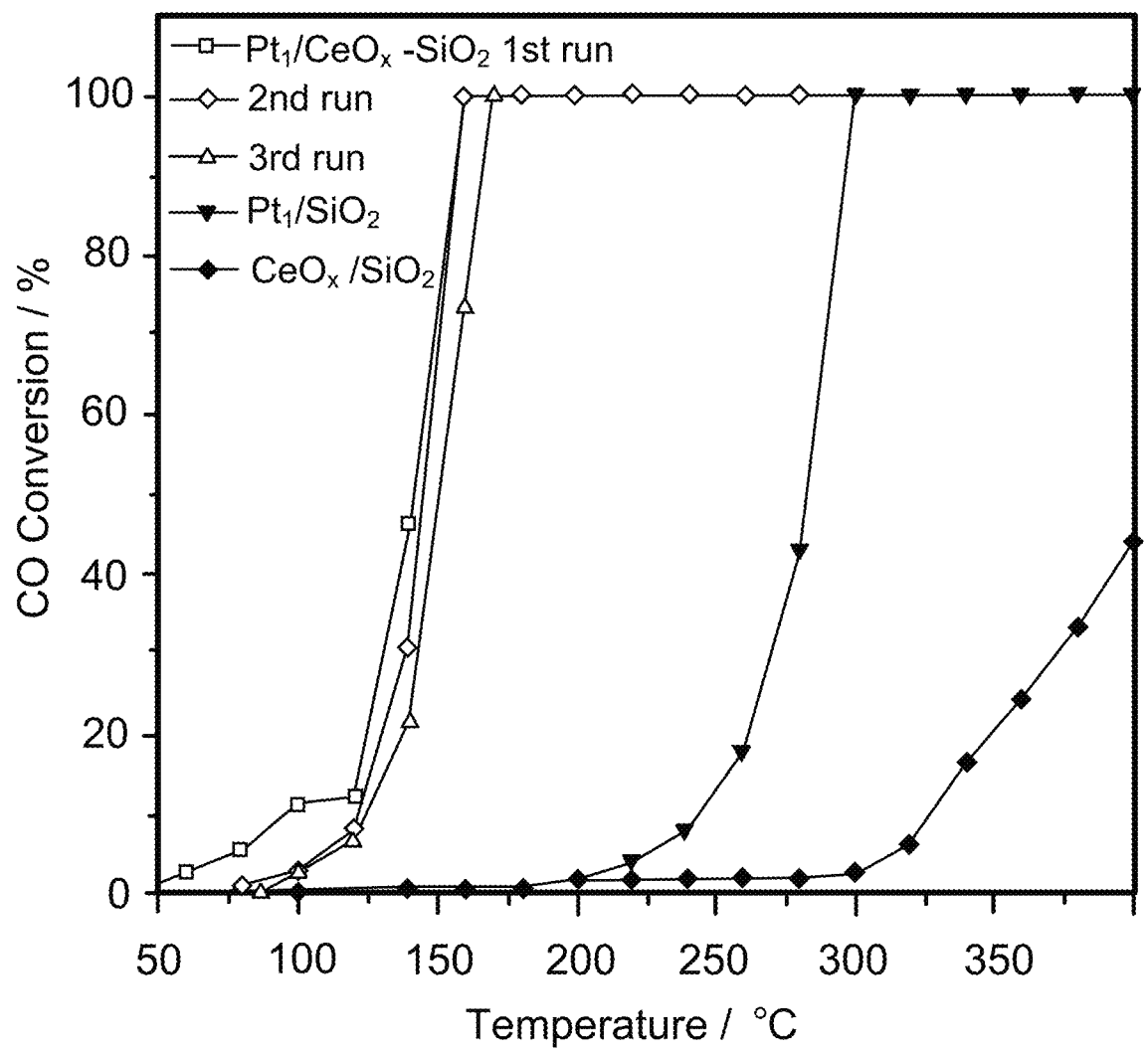
FIG. 25D shows catalytic testing data for CO oxidation on various types of catalysts.

FIG. 25A depicts high-number density $CeO_x$—$SiO_2$ supported $Pt_1$ catalyst 2500, with platinum atoms 2502 on $CeO_x$ cluster 2504 and $SiO_2$ support 2506. FIG. 25B shows HAADF-STEM images of a typical $Pt_1/CeO_x$—$SiO_2$ single-atom catalyst showing spatial distribution of the $CeO_x$ nanoislands 2508. FIG. 25C shows the atomic structure of the $CeO_x$ clusters 2510. The $Pt_1$ atoms cannot be reliably identified due to lack of proper image contrast. FIG. 25D shows catalytic testing data for CO oxidation. The conversion rates for the $Pt_1/SiO_2$ and the $CeO_x$—$SiO_2$ controls were displayed as well. Reaction conditions: 1 vol % CO and 4 vol % $O_2$ balanced with He, pressure=0.1 MPa, SV=20,000 mL/g·h.

FIG. 25B shows representative HAADF-STEM images of the as-synthesized $Pt_1/CeO_x$—$SiO_2$ SAC. The bright patches (indicated by the yellow arrows) represent uniformly dispersed $CeO_x$ clusters with an average size of 2 nm and Pt nanoclusters are not observable. DRIFTS and EXAFS results show that the Pt species exists as isolated single Pt atoms. The Ce 3d XPS spectrum of the $Pt_1/CeO_x$—$SiO_2$ SAC reveal enrichment of oxygen vacancies in the $CeO_x$ nanoclusters since the $Ce^{3+}/(Ce^{4+}+Ce^{3+})$ ratio is 26% (FIG. 7A) vs 10% for $CeO_2$ nanocrystals (FIG. 7B). CO oxidation over the as-synthesized $Pt_1/CeO_x$—$SiO_2$ SAC demonstrates that the $CeO_x$ anchored $Pt_1$ atoms are not only highly active but extremely stable during the three reaction cycles (FIG. 25D). The CO-DRIFTS results of the used $Pt_1/CeO_x$—$SiO_2$ SAC demonstrate that the localized $Pt_1$ atoms did not sinter and maintained their catalytic property during the CO oxidation reaction. The crystalline nature and the dispersion of the CeO$_x$ clusters are clearly shown in FIG. 25C. Some small CeO$_x$ clusters are almost atomically dispersed and do not possess a crystalline phase. Although it is difficult to distinguish single Pt atoms from those of the highly dispersed Ce atoms/clusters we have not detected, in the as-prepared and used SACs, any Pt particles/clusters which are distinguishable from the CeO$_x$ clusters. FIG. 25D shows the catalytic testing data clearly demonstrating the high activity and stability of the Pt$_1$/CeO$_x$—SiO$_2$ SAC for the CO oxidation reaction.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A nanocomposite catalyst comprising:
   a support;
   a multiplicity of nanoscale metal oxide clusters coupled to the support; and
   1-100 metal atoms coupled to each of the nanoscale metal oxide clusters,
   wherein the support is negatively charged, the nanoscale metal oxide clusters are positively charged, the 1-100 metal atoms are negatively charged, and the support is free of direct contact with the 1-100 metal atoms.

2. The catalyst of claim 1, wherein the support comprises a refractory material having a surface area of at least 50 m$^2$/g or at least 100 m$^2$/g.

3. The catalyst of claim 2, wherein the support comprises silica, alumina, magnesia, zirconia, cordierite, mullite, perovskite or any combination thereof.

4. The catalyst of claim 2, wherein the support is powdered.

5. The catalyst of claim 1, wherein the nanoscale metal oxide clusters comprise CeO$_2$, Co$_3$O$_4$, Fe$_2$O$_3$, TiO$_2$, CuO, NiO, MnO$_2$, Nb$_2$O$_5$, ZrO$_2$ or any combination thereof.

6. The catalyst of claim 1, wherein the 1-100 metal atoms independently comprise one or more transition metal atoms.

7. The catalyst of claim 6, wherein the 1-100 metal atoms independently comprise one or more precious metal atoms.

8. The catalyst of claim 7, wherein the 1-100 metal atoms comprise Pt, Pd, Rh, Au, Ru, Ir, or any combination thereof.

9. The catalyst of claim 1, wherein the support comprises SiO$_2$ and the metal oxide clusters comprise, CeO$_2$, Co$_3$O$_4$, CuO, Fe$_2$O$_3$, or any combination thereof.

10. The catalyst of claim 1, wherein the nanoscale metal oxide clusters have a dimension in a range of 0.5 nm to 10 nm.

11. A method of catalyzing a reaction comprising contacting the nanocomposite catalyst of claim 1 with reactants, wherein the reaction comprises CO oxidation, water-gas-shift reaction, reforming of CO$_2$ and methanol, or oxidation of natural gas.

12. A method of fabricating a nanocomposite catalyst, the method comprising:
   forming nanoscale metal oxide clusters comprising a first metal on a support; and
   depositing 1-100 metal atoms comprising a second metal on the nanoscale metal oxide clusters,
   wherein the support is free of direct contact with the second metal.

13. The method of claim 12, wherein the nanoscale metal oxide clusters comprise CeO$_2$, Co$_3$O$_4$, Fe$_2$O$_3$, TiO$_2$, CuO, NiO, MnO$_2$, Nb$_2$O$_5$, ZrO$_2$, or any combination thereof.

14. The method of claim 12, wherein the 1-100 metal atoms independently comprise one or more transition metal atoms.

15. The method of claim 12, wherein the 1-100 metal atoms independently comprise one or more precious metal atoms.

16. The method of claim 12, wherein the support comprises a refractory material having a surface area of at least 50 m$^2$/g or at least 100 m$^2$/g.

* * * * *

UNITED STATES PATENT AND TRADEMARK OFFICE
CERTIFICATE OF CORRECTION

| | | |
|---|---|---|
| PATENT NO. | : 11,766,663 B2 | Page 1 of 1 |
| APPLICATION NO. | : 16/897871 | |
| DATED | : September 26, 2023 | |
| INVENTOR(S) | : Jingyue Liu and Xu Li | |

It is certified that error appears in the above-identified patent and that said Letters Patent is hereby corrected as shown below:

In the Specification

Column 1, Line 10, delete "NANOGULES" and insert -- NANOGLUES --.

Signed and Sealed this
First Day of April, 2025

Coke Morgan Stewart
*Acting Director of the United States Patent and Trademark Office*